United States Patent
Groleau et al.

(10) Patent No.: US 10,721,554 B2
(45) Date of Patent: Jul. 21, 2020

(54) AUDIO DIRECTING LOUDSPEAKER GRILL

(71) Applicant: Harman International Industries, Incorporated, Stamford, CT (US)

(72) Inventors: Patrick Groleau, South Lyon, MI (US); Kyle Concessi, Wixom, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 16/235,660

(22) Filed: Dec. 28, 2018

(65) Prior Publication Data
US 2019/0222924 A1 Jul. 18, 2019

Related U.S. Application Data

(60) Provisional application No. 62/616,974, filed on Jan. 12, 2018.

(51) Int. Cl.
*H04R 1/30* (2006.01)
*H04R 5/02* (2006.01)
(Continued)

(52) U.S. Cl.
CPC .............. *H04R 1/30* (2013.01); *B60N 2/879* (2018.02); *H04R 1/023* (2013.01); *H04R 1/025* (2013.01);
(Continued)

(58) Field of Classification Search
CPC .......... H04R 1/30; H04R 1/023; H04R 1/345; H04R 1/025; H04R 5/023; H04R 1/028; H04R 2499/13; B60N 2/879
See application file for complete search history.

(56) References Cited

U.S. PATENT DOCUMENTS 4,365,113 A * 12/1982 Soma ................. H04R 1/02
181/144
4,625,829 A * 12/1986 Sirois ................. G10K 11/28
181/141
(Continued)

FOREIGN PATENT DOCUMENTS

EP 1509063 A1 2/2005
EP 2699018 A1 2/2014
(Continued)

OTHER PUBLICATIONS

Hiraga, J., "Les Haut-Parleurs," ISBN: 978-2-10-005268-4, Dunod, Paris, 1 page. (See NPL 2, European Search Report Issued in Application No. 19151070.0 for Explanation of Relevancy).
(Continued)

*Primary Examiner* — Oyesola C Ojo
(74) *Attorney, Agent, or Firm* — McCoy Russell LLP

(57) ABSTRACT

Examples are provided for a speaker system that redirects sound toward a listener, such as an occupant of a vehicle. The speaker system may be integrated into a headrest of a vehicle. An example speaker system includes a transducer adapted to generate sound waves at a first transducer output, a horn coupled to the transducer output and adapted to guide the sound waves from the transducer toward a horn output, and a grill coupled to the horn via a curved joint and adapted to redirect the sound waves from the horn output. The example speaker system may further include a pad ring or bezel positioned between the transducer and the horn.

20 Claims, 15 Drawing Sheets

(51) Int. Cl.
*B60N 2/879* (2018.01)
*H04R 1/02* (2006.01)
*H04R 1/34* (2006.01)

(52) U.S. Cl.
CPC ............. *H04R 1/345* (2013.01); *H04R 5/023* (2013.01); *H04R 1/028* (2013.01); *H04R 2499/13* (2013.01)

(56) References Cited

U.S. PATENT DOCUMENTS

| | | | | |
|---|---|---|---|---|
| 6,975,737 | B2 * | 12/2005 | Hirao | H04R 5/023 381/302 |
| 8,130,987 | B2 * | 3/2012 | Kaneda | H04R 1/26 381/301 |
| 9,381,873 | B2 * | 7/2016 | Cotton | B60R 11/0217 |
| 9,517,732 | B2 * | 12/2016 | Silzle | H04R 5/023 |
| 9,682,641 | B1 * | 6/2017 | Subat | H04R 1/023 |
| 9,930,433 | B2 * | 3/2018 | Subat | H04R 1/023 |
| 2001/0052280 | A1 * | 12/2001 | Konishi | G10H 1/32 84/277 |
| 2004/0021350 | A1 * | 2/2004 | House | A47C 7/72 297/217.4 |
| 2012/0008806 | A1 * | 1/2012 | Hess | H04R 1/023 381/302 |
| 2017/0094403 | A1 * | 3/2017 | Tipparaju | H04R 1/288 |
| 2017/0267138 | A1 * | 9/2017 | Subat | B60N 2/879 |

FOREIGN PATENT DOCUMENTS

| | | |
|---|---|---|
| EP | 2903299 A2 | 8/2015 |
| WO | 2017160594 A1 | 9/2017 |

OTHER PUBLICATIONS

European Patent Office, Extended European Search Report Issued in Application No. 19151070.0, dated May 28, 2019, Germany, 16 pages.

* cited by examiner

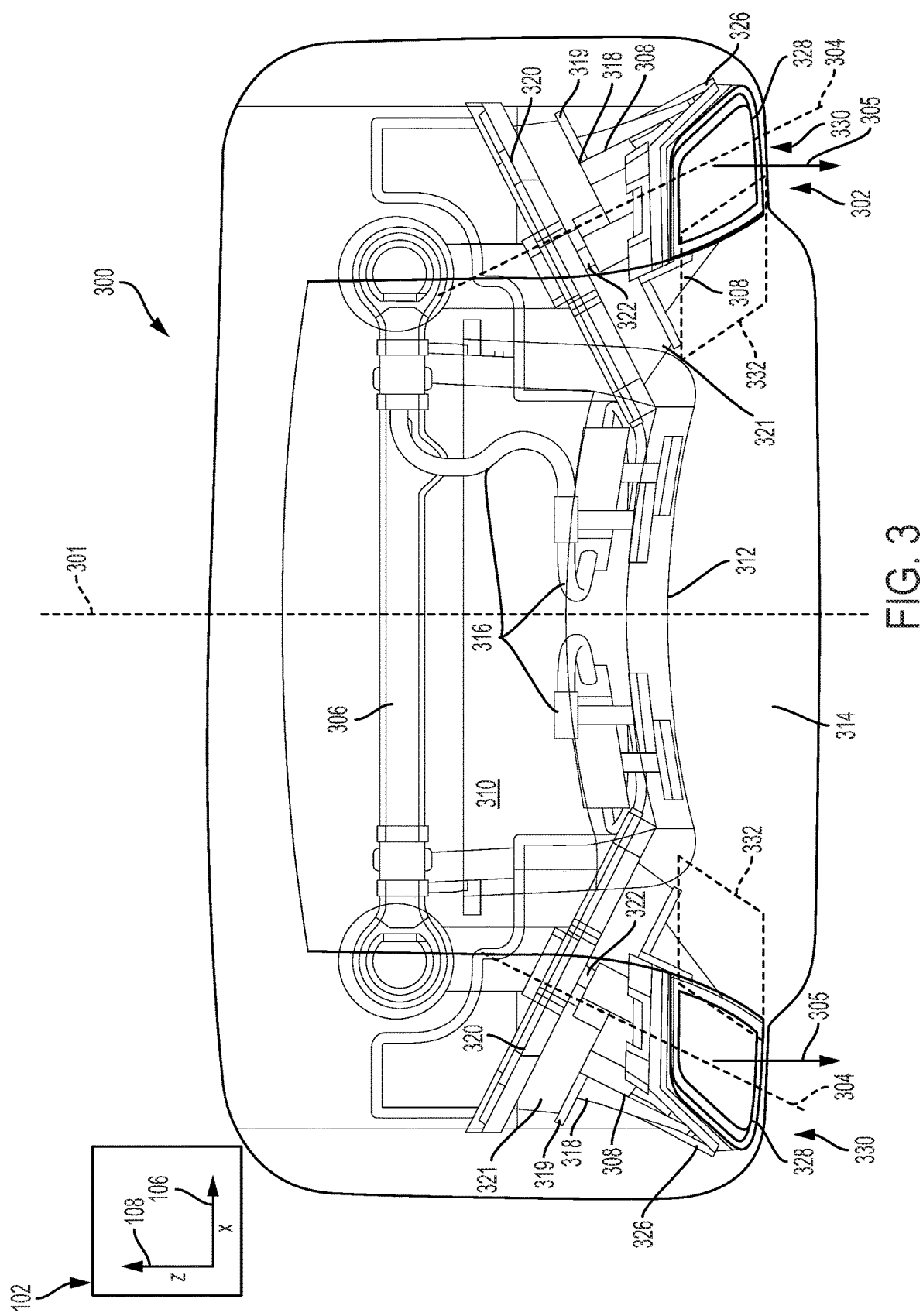

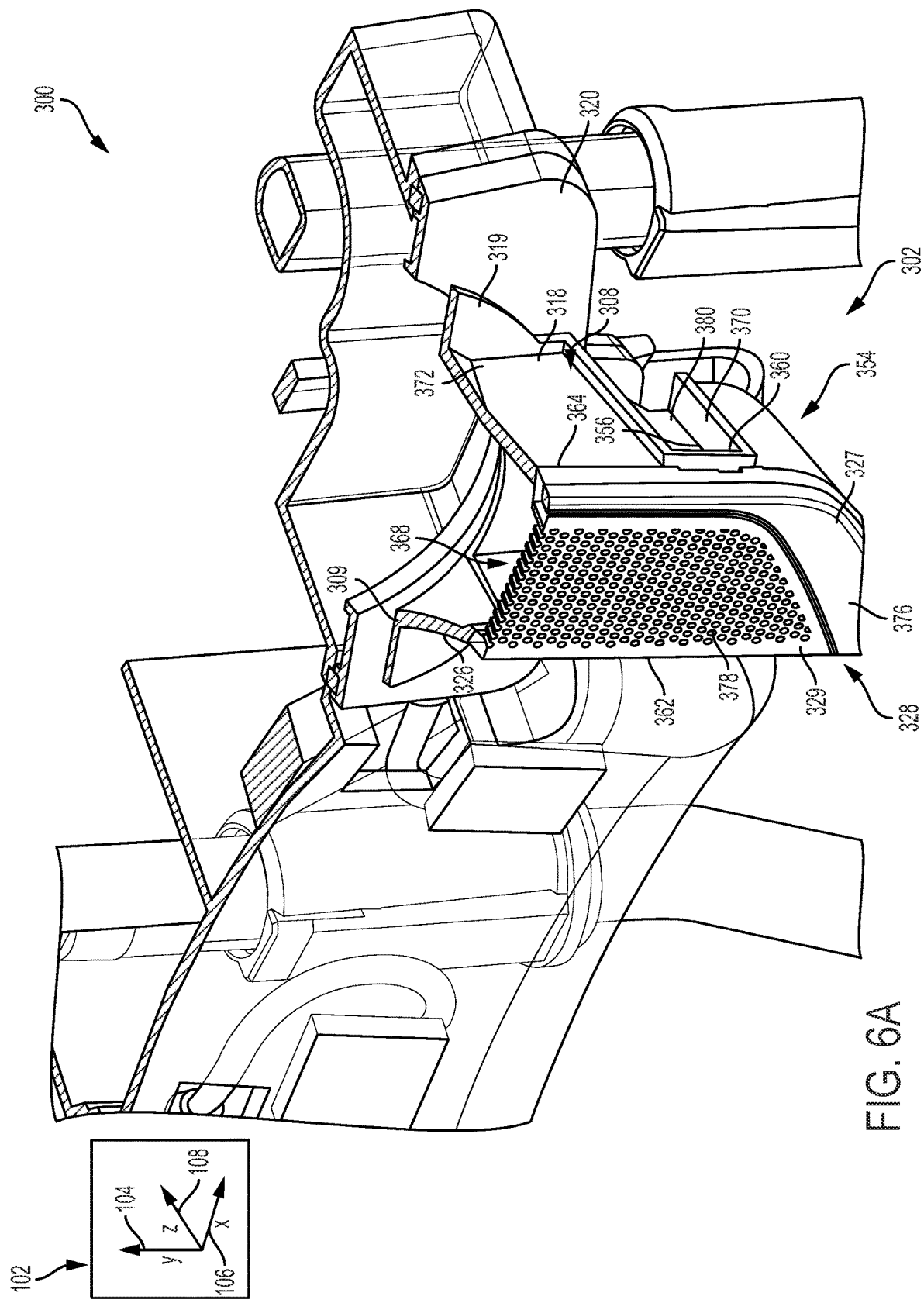

US 10,721,554 B2

AUDIO DIRECTING LOUDSPEAKER GRILL

CROSS REFERENCE TO RELATED APPLICATIONS

The present application claims priority to U.S. Provisional Application No. 62/616,974 entitled "AUDIO DIRECTING LOUDSPEAKER GRILL", and filed on Jan. 12, 2018. The entire contents of the above-listed application are incorporated by reference for all purposes.

FIELD

The disclosure relates to configurations for transducers and associated directional grills for loudspeakers.

BACKGROUND

Loudspeakers may be used in a variety of environments, and may be packaged in standalone housings or integrated with other structures. For example, in a vehicle environment, loudspeakers may be integrated in doors, dashes, rear decks, and headrests. Speakers mounted in headrests may present a particular challenge due to the proximity of the headrest to the head and ears of a potential listener, as well as the safety features of headrests that limit space available for the speaker elements.

SUMMARY

A vehicle headrest may have a dedicated head support region in the center of the headrest that includes compressible materials for comfort and shock absorption. Accordingly, components of headrest-integrated speakers may be positioned on respective sides of the headrest. However, the space available for the speakers within the headrest may cause the speakers to be positioned at an angle relative to a location of a head of an associated seat occupant. For example, the speakers may be angled outward away from ears of the seat occupant, thereby reducing a listening experience for the seat occupant.

The present disclosure provides configurations of headrest-integrated speakers that redirect sound output such that the sound travels approximately straight past the ears of an associated seat occupant. For example, the speakers of the present disclosure include a transducer coupled to a waveguide, horn, bezel, or any combination of waveguide(s), horn(s), or bezel which is in turn coupled to a redirecting grill interfacing between the waveguide, horn, and/or bezel (inside a headrest) and an exterior of the headrest. The redirecting grill may be curved to provide a smooth interface between the waveguide, horn, and/or bezel and the exterior of the headrest.

Embodiments are disclosed for a speaker system that redirects sound toward a listener, such as an occupant of a vehicle. The speaker system may be integrated into a headrest of a vehicle, such as a headrest of a seat in which the listener is seated. In other examples, the speaker system may be integrated in another area, such as a rear seat center speaker region, or other location in a vehicle cabin to provide a center channel or mono sound source. An example speaker system includes a first transducer adapted to generate sound waves at a first transducer output, a second transducer adapted to generate sound waves at a second transducer output, a first horn coupled to the first transducer output and adapted to guide the sound waves from the first transducer toward a first horn output, and a second horn coupled to the second transducer output and adapted to guide the sound waves from the second transducer toward a second horn output. The example speaker system further includes a first grill coupled to the first horn via a first curved joint of the first grill and adapted to redirect the sound waves from the first horn output, and a second grill coupled to the second horn via a second curved joint of the second grill and adapted to redirect the sound waves from the second horn output, each of the first grill and the second grill adapted to redirect the respective sound waves from the first horn output and the second horn output to a common direction.

Another example speaker system includes a first transducer and a second transducer positioned on opposing sides of a center plane, a first horn and a second horn coupled to the first transducer and the second transducer, respectively, and a first grill and a second grill coupled to the first horn and the second horn, respectively, the first grill and the second grill configured to redirect sound from the first horn and the second horn to a common direction that is parallel to the central plane.

The disclosure also provides for a headrest including a first transducer and a second transducer positioned on opposing sides of a center plane of the headrest, a first horn and a second horn coupled to the first transducer and the second transducer, respectively, and a first grill and a second grill coupled to the first horn and the second horn, respectively, the first grill and the second grill configured to redirect sound from the first horn and the second horn to a common direction that is parallel to the central plane of the headrest.

BRIEF DESCRIPTION OF THE DRAWINGS

The disclosure may be better understood from reading the following description of non-limiting embodiments, with reference to the attached drawings, wherein below:

FIG. 3 shows a top view of an example speaker system within a headrest, in accordance with one or more embodiments of the present disclosure;

FIG. 6A shows a cross-sectional view of one side of the exemplary speaker system arranged in the headrest of FIG. 3, in accordance with one or more embodiments of the present disclosure;

DETAILED DESCRIPTION

Figure 1:
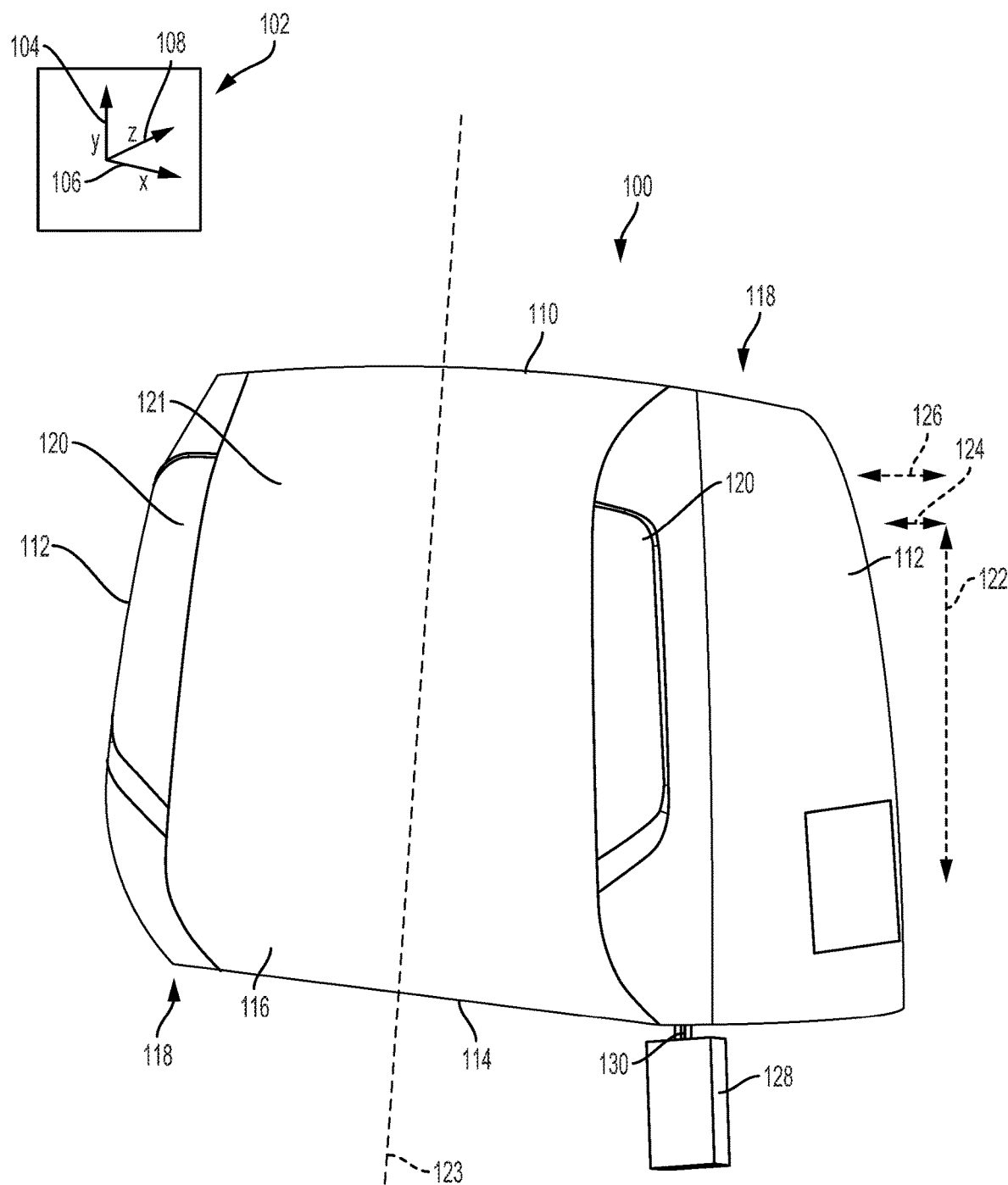
FIG. 1 shows a perspective view of an example headrest with a set of grills integrated in a surface of the headrest, in accordance with one or more embodiments of the present disclosure.
Figure 2A:
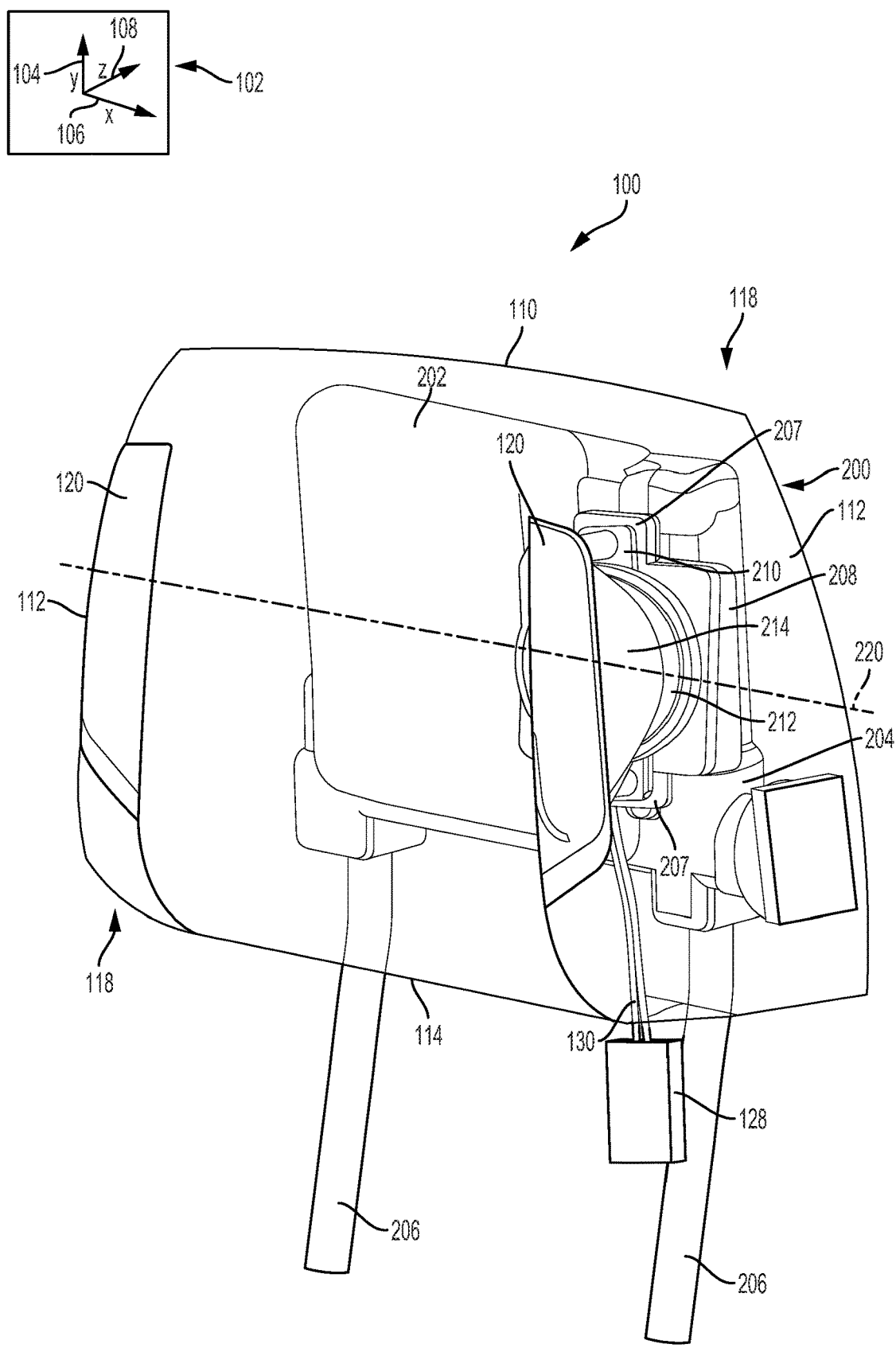
FIG. 2A shows an example arrangement of components of portions of a speaker system within the headrest of FIG. 1, in accordance with one or more embodiments of the present disclosure.
Figure 2B:
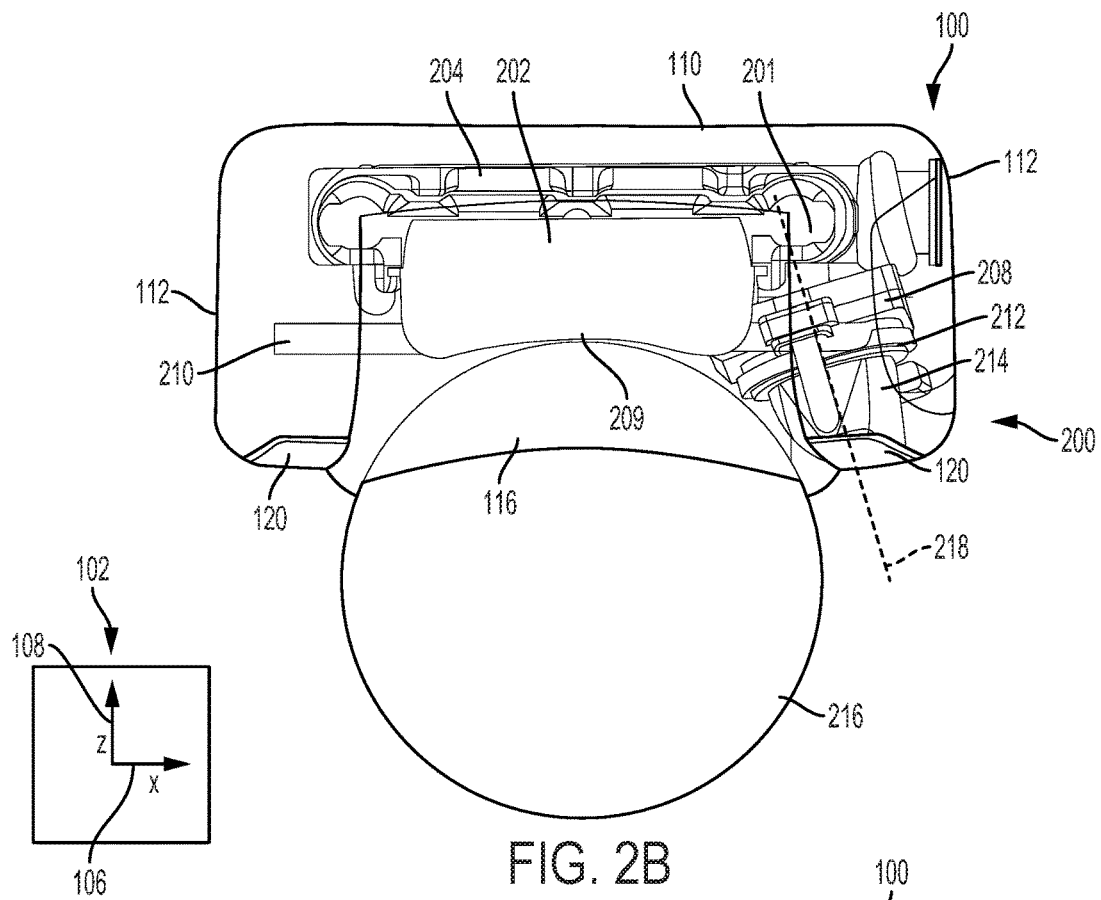
FIG. 2B shows a top view of components of portions of the speaker system within the headrest of FIG. 1, in accordance with one or more embodiments of the present disclosure.
Figure 2C:
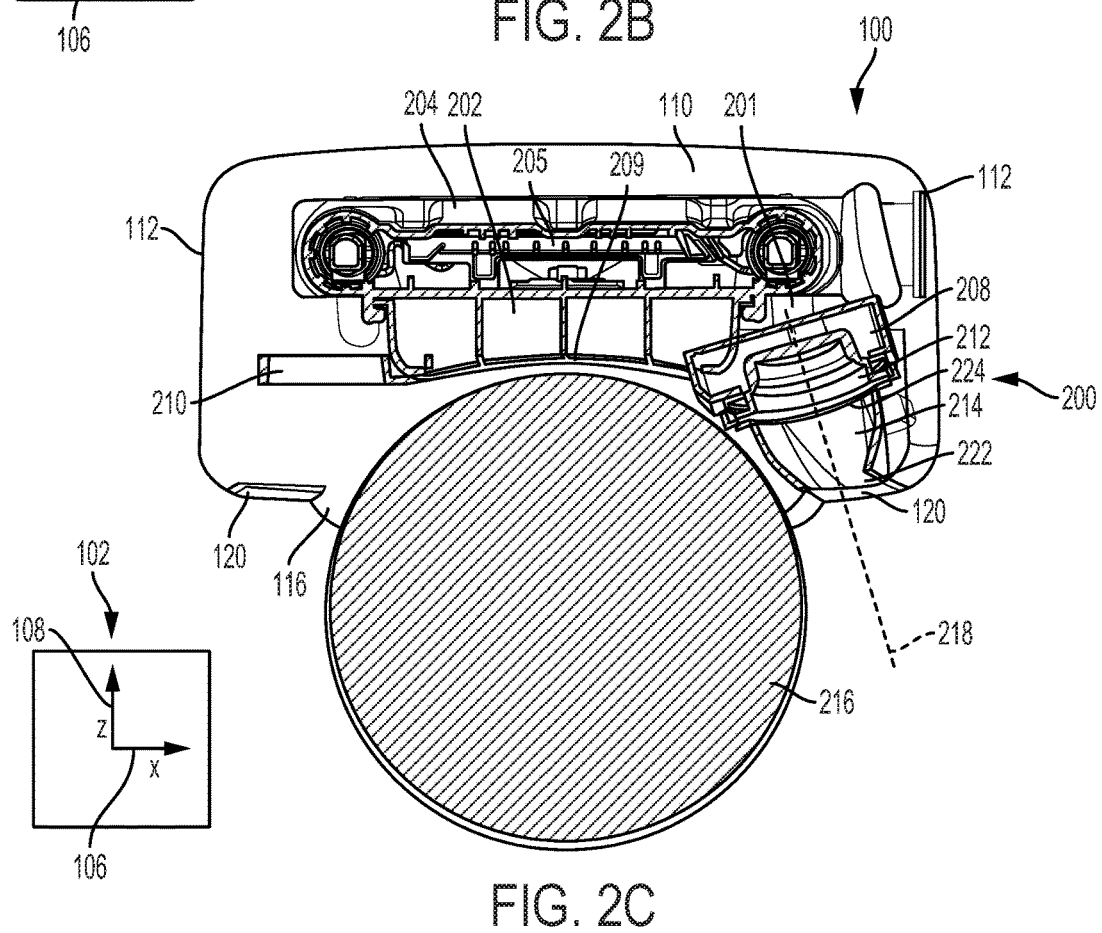
FIG. 2C shows a cross-sectional top view of the components of portions of the speaker system of FIG. 2B, in accordance with one or more embodiments of the present disclosure.
Figure 4A:
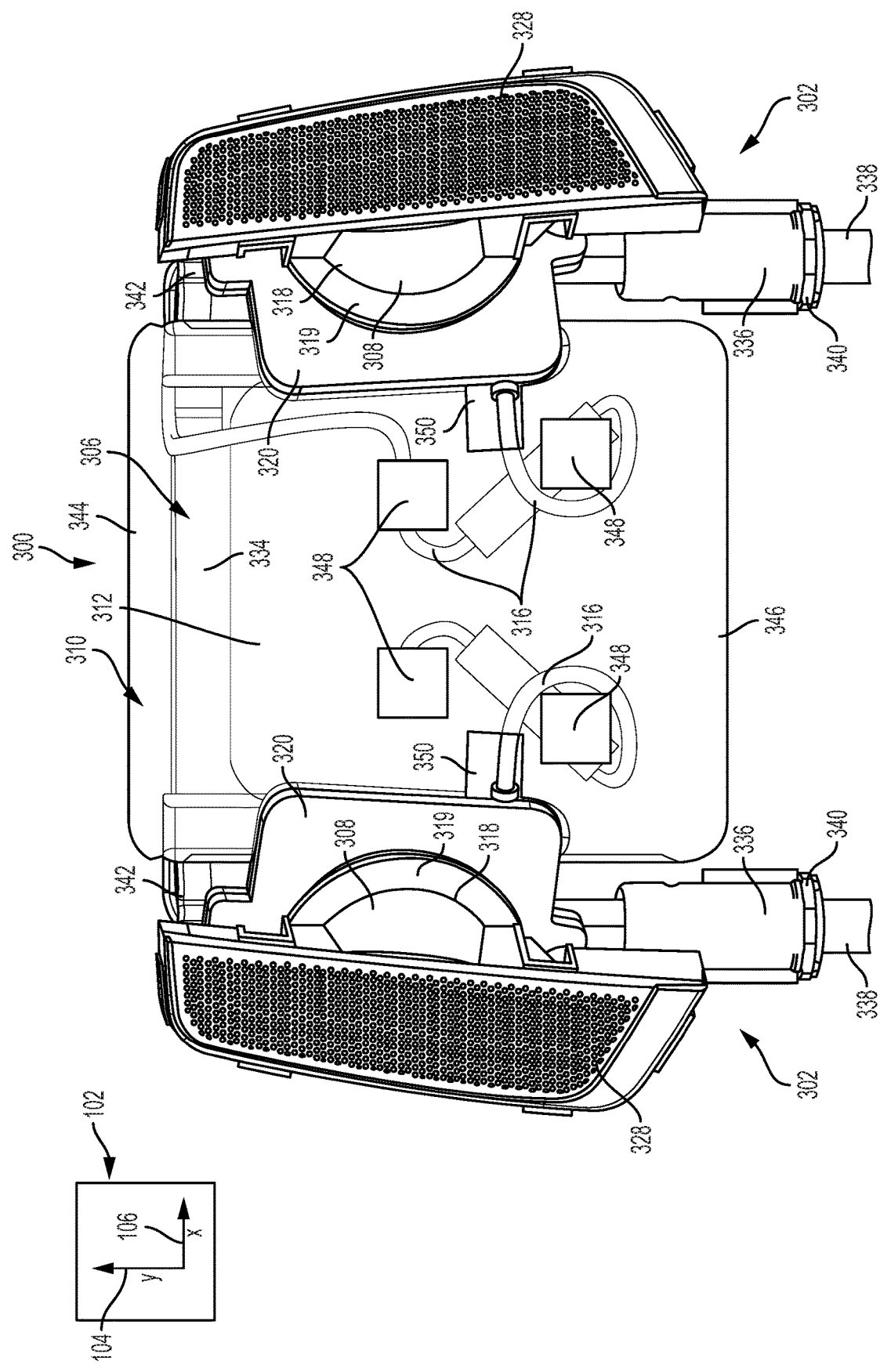
FIG. 4A shows a frontal view of an exemplary speaker system arranged in the headrest of FIG. 3 with the outer surface of the headrest removed, in accordance with one or more embodiments of the present disclosure.
Figure 4B:
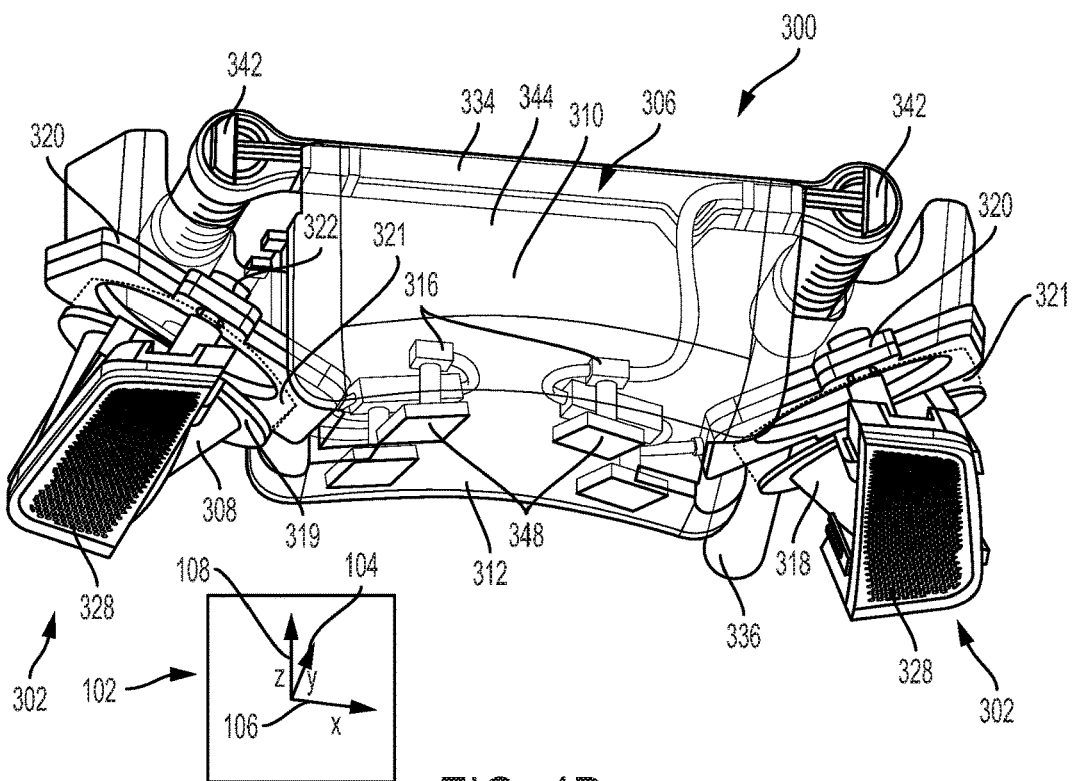
FIG. 4B shows an angled top view of the exemplary speaker system arranged in the headrest of FIG. 3, in accordance with one or more embodiments of the present disclosure.
Figure 4C:
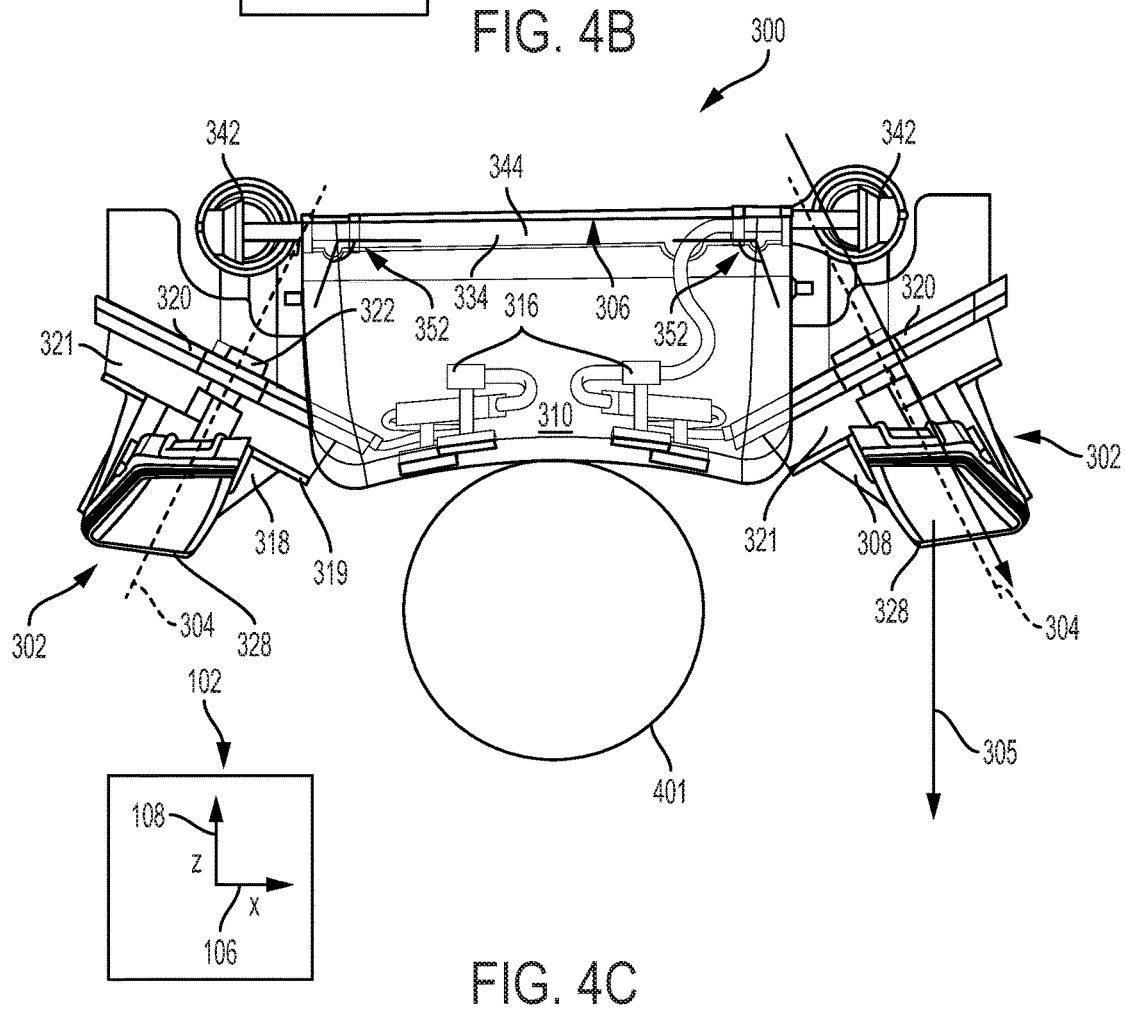
FIG. 4C shows a direct top view of the exemplary speaker system arranged in the headrest of FIG. 3, in accordance with one or more embodiments of the present disclosure.

In order to provide an enjoyable listening experience for one or more occupants, a headrest (or a plurality of headrests in a vehicle) may be adapted with a speaker system including horns embedded within the headrest to propagate sound and grills to control the direction of sound output. An example of the placement of a set of said grills in a front surface of a headrest is illustrated in FIG. 1. FIGS. 2A-2C shows different views of an arrangement of one side of the speaker system inside the headrest. The positioning of the elements of the speaker system relative to an occupant is provided in FIGS. 2B-2C. An example speaker system enclosed in the headrest, including accompanying hardware, is depicted in FIG. 3. FIGS. 4A-4C illustrate different views of a headrest, without the external surface, adapted with an exemplary speaker system with a focus on the positioning and geometry of the speaker system elements. More detailed views of one side of the speaker system are given in FIGS. 5A-5B, from a sequence of different perspectives, to show the coupling between a horn and the grill. FIGS. 6A-6C provide cross-sectional illustrations of an exemplary horn coupled to a grill to highlight the geometry, surface thicknesses, and orientation of the horn relative to a supporting element of the speaker system. An embodiment of the grill is shown in FIGS. 7A-7D, depicting front and rear views as well as cross-sections of the grill to show the alignment of a plurality of apertures in the grill that assist in directing sound past ears of an occupant (e.g., when included in a headrest, such as the example headrests of FIGS. 1-6C).

Turning now to FIG. 1, a headrest 100, such as a headrest used in a seat for a motor vehicle, utility vehicle, movie theatre, and/or other environment, may have a generally trapezoidal outline with a top end 110, a set of sides 112, and a bottom end 114. A set of reference axes 102 is provided for comparison between views shown, indicating a vertical "y" direction 104, a horizontal "x" direction 106, and a lateral "z" direction 108. The sides 112 are slanted with respect to the vertical direction 104 so the distance between the tops of the sides 112 is shorter than the distance between the bottoms of the sides 112. The regions at which the top end 110 mates with the tops of the sides 112 and the bottom end 114 mates with bottoms of the sides 112 may be curved. The top end 110 and the sides 112 may be slightly curved along the respective horizontal and vertical directions and the bottom end 114 may be substantially straight along the respective horizontal direction. The headrest 100 may have a thickness, measured along the lateral direction 108, that may be greatest at the bottom end 114 and that decreases nonlinearly in thickness along the vertical direction 104 towards the top end 110.

A central region 116 of the headrest 100 may act as a head support and may be formed from compressible materials, such as foam, to cushion a head of an occupant. The central region 116 may have a thickness, measured in the lateral direction 108 that is greater than a set of side portions 118 of the headrest 100 extending in the horizontal direction 106 outside of the central region 116. A set of grills 120 may be integrated in a front surface 121 of the headrest. The grills may each include an acoustically-permeable structure that physically protects an associated speaker system (e.g., the speaker system described below with respect to FIGS. 2A-2C) while allowing acoustic waves to pass through the grill.

The front surface may be positioned at different depths (positions in the lateral direction 108) at different regions of the headrest. For example, the front surface 121 in the region of the side portions 118 may be recessed relative to the front surface 121 in the central region 116. The set of grills 120 may be disposed in each of the side portions 118. For example, each grill 120 may be integrated in the front surface 121 of the headrest (in the region of the side portions 118). In this way, a portion of the front surface 121 of the headrest (in the region of the side portions 118) may be formed by the grills 120. Each grill 120 may have a length, indicated by an arrow 122, which may be shorter than the side 112 of the headrest 100. An aspect ratio of the grill may have an effect on a performance of the horn and grill (e.g., sound directivity, propagation, etc.). In one example, an aspect ratio (e.g., length to width) of the grill may be 4:1. Each grill 120 may be mirror symmetric about a central axis 123 extending approximately vertically along a height of the front surface 121. Each grill 120 may have a maximum width, indicated by an arrow 124, which is shorter than a width, indicated by an arrow 126 of the side portion 118. A front surface of the grills 120 (the surface visible in FIG. 1) may follow a curvature of an associated region of the front surface 121.

The headrest 100 may also include a plug 128 mated to a set of cables 130 for communication with a speaker system, such as the speaker systems described below with respect to FIGS. 2A-2C and/or FIGS. 3-6C, and/or a device operated by the occupant that is executable to control the sound frequency, volume, etc.

The headrest illustrated in FIG. 1 is one example configuration of a headrest adapted with a speaker system. A second example of the headrest 100 may include a different number of grills disposed in the surface of the headrest. In another example, the grills may have alternate shapes or sizes. As such, it is appreciated that the scope of this disclosure should not be limited by the number, shape, or size of the grills described herein.

The headrest 100 is shown in FIGS. 2A-2C with an exemplary speaker system 200, with one side omitted for simplicity, arranged in an interior of the headrest 100. The set of reference axes 102 is provided for comparison between views shown, indicating the vertical direction 104, the horizontal direction 106, and the lateral direction 108. As shown in FIG. 2A, the exterior of the headrest 100 may include, as described above with respect to FIG. 1, the top end 110, the bottom end 114 and the set of sides 112. The headrest 100 may also include the set of side portions 118 in which the set of grills 120 may be disposed.

The interior of the headrest 100 may include an inner casing or other structure 202 that may be formed from a rigid material, such as metal or plastic, or compressible material, such as a foam material, and has a front surface that is covered by the compressible material of the central region 116 for cushioning an occupant's head. Accordingly, a region between the front surface of the inner casing or structure 202 and the front surface 121 of the headrest (shown in FIG. 1) may include compressible material and/or air. The interior of the headrest 100 may also include an inner framework 204 formed from a metal or some other rigid material providing structural integrity to the headrest 100. The inner framework 204 may also support an electronic device 205 (shown in FIG. 2C) or other circuitry adapted to receive signals from a controller operated by the occupant and transmit the signals to a transducer 212. A pair of rods 206, shown in FIG. 2A, are coupled to the inner framework 204 and extend out of the bottom end 114 of the headrest 100 approximately along the vertical direction 104. The rods 206 may be configured to slide into a set of ports in a body of a vehicle seat to attach the headrest 100 to the body of the seat.

The inner casing or structure 202 and the inner framework 204 may be aligned in the vertical direction 104 within the interior of the headrest 100 and a first side of a speaker system 200 may also have a planar surface that is aligned in approximately the vertical direction 104 and positioned between the inner framework 204 and the grills 120. The speaker system 200 may comprise a support plate 208, an optional connector or other internal structure 210 to which each side of the speaker system 200 is secured, a transducer 212 for radiating sound waves, and a horn 214 for propagating sound waves. The horn 214 may be coupled to the grill 120, such that sound waves propagated by the horn pass through openings (e.g., apertures) in the grill. As will be discussed below, the openings (e.g., apertures) of the grill 120 may be configured to redirect the sound waves from the horn to pass directly by the ears of the occupant (e.g., in a direction that is perpendicular to the front surface of the headrest). The support plate may be square with rounded corners and may include a set of tabs 207 extending along the vertical direction 104 from the top and bottom edges of the supporting plate. The transducer 212 may have a circular outer shape. The horn 214 may have a conical outer shape.

A top view of the headrest 100 is depicted in FIG. 2B where a sphere 216, representing a head of an occupant, is shown in contact with the headrest 100. A back region of the sphere 216 is shown circumferentially surrounded by a front surface of the central region 116 of the headrest 100. The side of the speaker system 200 shown may have a central axis 218 that is tilted relative to the lateral direction 108 so that the central axis 218 forms an obtuse angle with the plane of the inner framework and such that the speaker system 200 has an outward angle that enables the speaker system to accommodate the curve of the sphere 216. The speaker system 200 is connected to the inner framework 204 via a rod 201 that is parallel with the lateral direction 108 (e.g., coaxial with central axis 218 of the speaker system). The two sides of the speaker system 200 may be connected to one another via the internal structure 210 which may be formed of a flexible material or a rigid material capable of deformation so that a central portion of the internal structure 210 may be curved to align with a curved front surface 209 of the inner casing or structure 202.

A cross-sectional view of the headrest 100 is provided in FIG. 2C from the same perspective as in FIG. 2B but cut along the dashed line 220 shown in FIG. 2A. The cross-section shows the inner casing or structure 202 may provide a frontal barrier protecting electronic elements housed within the inner framework 204. The speaker system 200 may be connected to the inner framework 204 via the connecting rod 201, coupled to a planar surface of the support plate 208. A planar surface on the opposite side of the support plate 208 from the surface coupled to the connecting rod 201 is in face-sharing contact with the transducer 212 which may have a circular radiating surface area or other geometry. The transducer 212 may be coupled to an inner end 224 of the horn 214, which is a hollow chamber with a relatively thin shell, capped at an outer end 222 by the grill 120. The outer end 222 may have a smaller diameter than an inner end 224 of the horn 214.

A top view of another example of a headrest 300, similarly used as the headrest 100 in FIGS. 1-2C, is shown in FIG. 3 where both sides of a speaker system 302, which may be an example of the speaker system 200 in FIGS. 2A-2C, are included in the interior of the headrest 300. It is to be understood that the description of components in speaker system 200 of FIGS. 2A-2C may also be applied to similarly-named components in speaker system 302 of FIGS. 3-6C, and vice versa.

The sides of the speaker system 302 may be mirror symmetrical about a central axis 301 of the headrest 300. A set of reference axes 102 is provided for comparison between views shown, indicating the horizontal direction 106 and the lateral direction 108. FIG. 3 shows the angled alignment of the central axes 304 of the sides of speaker system 302, similar to the central axis 218 shown in FIGS. 2B-2C of the speaker system 200, relative to the plane of an inner framework 306, (as described with respect to the inner framework 204 shown in FIGS. 2B-2C). A set of horns 308 is shown in FIG. 3, which may be an example of the horns 214 shown in FIGS. 2B-2C. An inner structure 310, which may be similar to the inner casing or structure 202 shown in FIGS. 2B-2C, is presented schematically by an outline and shows contents that may be enclosed within the inner structure 310. The inner structure 310 may include a curved frontal surface 312 that may be covered by a central region 314 of the headrest 300, which may be similar to the central region 116 shown in FIGS. 1-2C. The central region 314 which may include a compressible material, such as foam. A plurality of electronic elements 316 (e.g. wires, connectors, fittings) may be enclosed within the inner structure 310 and may provide continuous communication between an electronic device, such as the electronic device or other circuitry 205 shown in FIG. 2C, supported by the inner framework 306 and a transducer(s), such as the transducer 212 shown in FIGS. 2A-2C.

The speaker system includes two transducers 321, positioned on opposing sides of the headrest 300, which may be examples of and/or include the transducer 212 shown in FIGS. 2A-2C. The transducers 321 may include a compression driver or other radiating mechanism to generate sound signals based on electrical signals applied to the transducers. Each transducer 321 may be associated with a different horn 308, such that sound waves generated by a given transducer 321 is propagated through the associated horn 308. Each transducer 321 may be positioned between a respective flange, also referred to as a pad ring or bezel 319 (extending from a respective inner end 318 of an associated horn 308) and a respective supporting plate 320. A respective screw 322 may secure each of the horns 308 to an associated supporting plate 320. The bezel 319 of each horn 308 may extend in a respective outwards direction from the associated central axis 304. For each horn 308, a respective outer end 326 may be coupled to a respective grill 328. The grills 328 may be disposed in the front surface of respective side portions 330 of the headrest 300, and may have planar surfaces aligned with a set of planes, as indicated by the dashed parallelograms 332, that are tilted with respect to both the central axes 304 and the lateral direction 108. The grills 328 may include a plurality of apertures that have a size, position, and/or other geometry to redirect sound from an associated horn 308 to a common direction 305 that passes by an ear of an occupant (e.g., an occupant with a head that is supported by the headrest 300, as shown in FIG. 4C and discussed below). The common direction may be perpendicular to a vertical axis of the headrest 300 and/or parallel with the central axis 301 (or a "y-z" center plane extending in the "y" and "z" directions and including the central axis). The common direction may also be perpendicular to an occupant-facing front surface of the headrest 300, as shown in FIGS. 4B and 4C. An angle between central axis 304 and common direction 305 may be in the range of 25 degrees to 35 degrees in some examples. The grills 328 may be tilted inwards so that the grills 328 are angled toward the ears of the occupant and/or the grills 328 may be flush with the front surface of the side portions 330. Example angling of the grills 328 will be described in further detail in future figure descriptions.

Frontal, angled top, and direct top views of the exemplary head rest 300 shown in FIG. 3 are provided in FIGS. 4A-4C. The set of reference axes 102 is provided for comparison between views shown, indicating the vertical direction 104, the horizontal direction 106, and the lateral direction 108. The exterior surface of the headrest 300 has been omitted in FIGS. 4A-4C (and in FIGS. 5A-6C, described below) for simplicity, showing the interior elements as well as the grills 328 of headrest 300. Beginning with the elements positioned furthest from an occupant in the headrest 300 that is illustrated in FIG. 4A, the inner framework 306 may include a horizontal portion 334 and a set of vertical portions 336. A pair of rods 338 may extend down approximately along the vertical direction 104 from a set of first ends 340 of the vertical portions 336 of the inner framework 306. The inner structure 310 may be adapted to slide up and down the pair of rods 338 (e.g., as the headrest is raised/lowered). The frontal surface 312 of the inner structure 310 may be generally square in shape and may be positioned in front of the horizontal portion 334 of the inner framework 306 and a top 344 of the frontal surface 312 of the inner structure 310 may extend across the full width, in the horizontal direction 106, of the horizontal portion 334. A bottom 346 of the frontal surface 312 of the inner structure 310 may be as wide as the distance between the vertical portions 336 of the inner framework 306 in some examples.

Fittings 348 may be arranged in the frontal surface 312 of the inner structure 310 to secure the electronic elements 316 behind the frontal surface 312 of the inner structure 310. A set of rectangular cut-out openings 350 may be disposed in the frontal surface 312 of the inner structure 310 adjacent to the speaker system 302 to allow passage of the electronic elements 316, such as wires or cables, from in front of the frontal surface 312 to behind the frontal surface 312 of the inner structure 310. The electronic elements 316 may allow for communication between the transducers, and an electronic device, an example of which is the electronic device 205 shown in FIG. 2C, supported by the inner framework 306.

The speaker system 302 extends down, in the vertical direction 104, along a length of the vertical portions 336 of the inner framework 306 from the second ends 342 of the vertical portions 336. The speaker system 302 also extends along a width, along the horizontal direction 106 so that a portion of the speaker system overlaps with a portion of the frontal surface 312 of the inner structure 310. The supporting plates 320 and the horns 308 are positioned in front of the inner framework 306 and inner structure 310, toward a location of an occupant, such as occupant 401, illustrated in FIG. 4C (when the occupant is present). The grills 328 are arranged in front of the horns 308 and are longer, measured in the vertical direction 104, than the supporting plates 320. The grills 328 are shorter, in the vertical direction 104, than the vertical portions 336 of the inner framework 306.

An angled top view of the headrest 300 is depicted in FIG. 4B. The speaker system 302 adapted to the headrest 300 is shown with gaps between the supporting plates 320 and the horn bezels 319 at the inner ends 318 of the horns 308 where a set of transducers 321, may be positioned. The supporting plates shown in FIGS. 4B and 4C may be tilted with respect to the lateral axis 108 so that the central axes 304 extending through the speaker system 302 each form an obtuse angle 352 with the plane of the horizontal portion 334 of the inner framework 306, as seen in FIG. 4C. The bezels 319 of the horns 308 may be parallel with the supporting plates 320 and thus tilted similarly. The inwards angling of the grills 328 with respect to the central axes 304 of the speaker system 302 is illustrated in FIG. 4C, as described above in the description of FIG. 3.

Figure 5A:
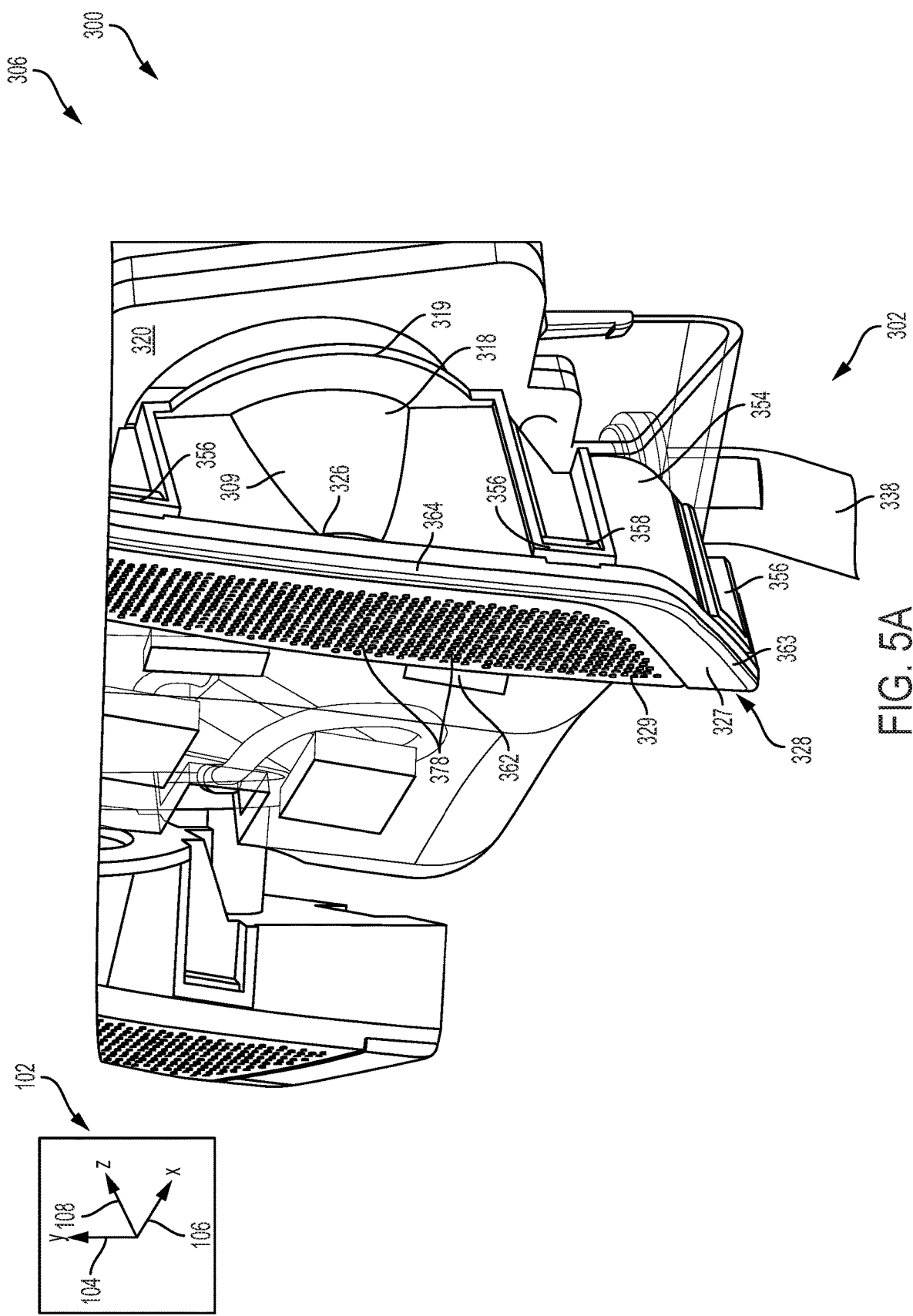
FIG. 5A shows a detailed isometric side perspective view of one side of the exemplary speaker system arranged in the headrest of FIG. 3 without the outer surface of the headrest, in accordance with one or more embodiments of the present disclosure.

A detailed isometric perspective view of the headrest 300 is shown in FIG. 5A with a focus one on side of the speaker system 302. The set of reference axes 102 is provided for comparison between views shown, indicating the vertical direction 104, the horizontal direction 106, and the lateral direction 108. The speaker system 302 is shown again with the gap between the supporting plate 320 and the bezel 319 of the horn 308 where a transducer, such as transducer 321, shown in FIGS. 3, 4B, and 4C, may be arranged. The horn 308 may be cone-shaped with a curved outer surface 309 and a larger diameter at the inner end 318 than the outer end 326 of the horn 308. The speaker system 302 may be adapted, as shown in FIGS. 5A-5B, with a receiving plate 354 that is attached to the outer surface 309 of the horn 308 and shaped to mate with the grill 328.

The receiving plate 354 may include a plurality of slots 356 arranged along the outer surface of the receiving plate 354 that are configured so that a plurality of tabs 358 disposed around the circumference of an outer frame 327 of the grill 328 may slide into the slots 356 of the receiving plate 354. The outer frame 327 of the grill 328 surrounds an inner hole pattern 329 of the grill 328 which may have a planar surface that extends outwards, in the lateral direction 108, beyond the planar surface of the outer frame 327 of the grill 328. The outer frame 327 may have a bottom end 363 that is tilted with respect to the horizontal direction 106, a first side 362 and a second side 364 where the sides 362 and 364 of the outer frame 327 of the grill 328 may be parallel to the vertical direction 104. The first side 362 may be longer than the second side 364 due to the angle of the bottom end 363 of the outer frame 327 of the grill 328.

Figure 5B:
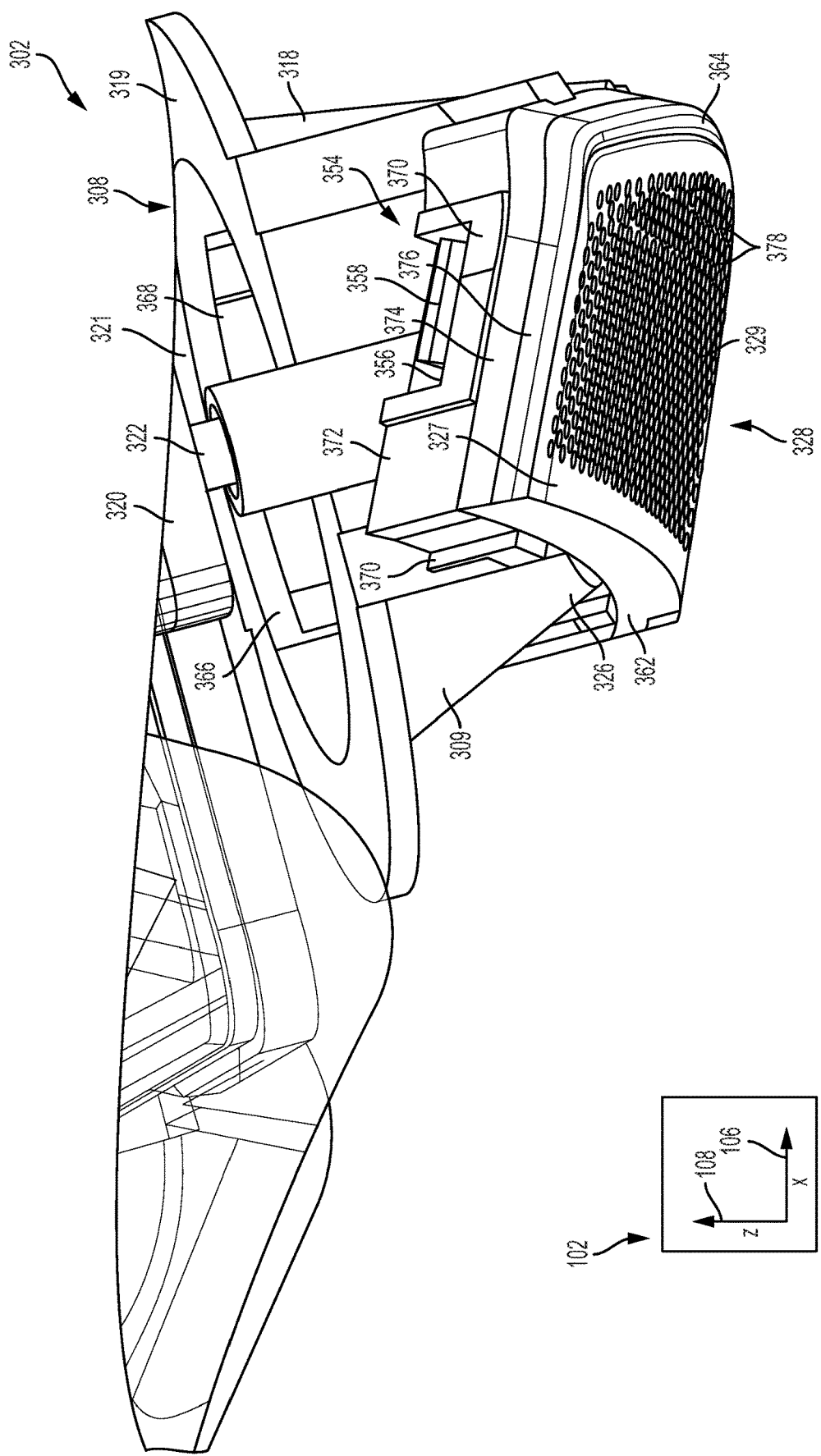
FIG. 5B shows a different detailed isometric top perspective view of one side of the exemplary speaker system arranged in the headrest of FIG. 3, in accordance with one or more embodiments of the present disclosure.
Figure 6B:
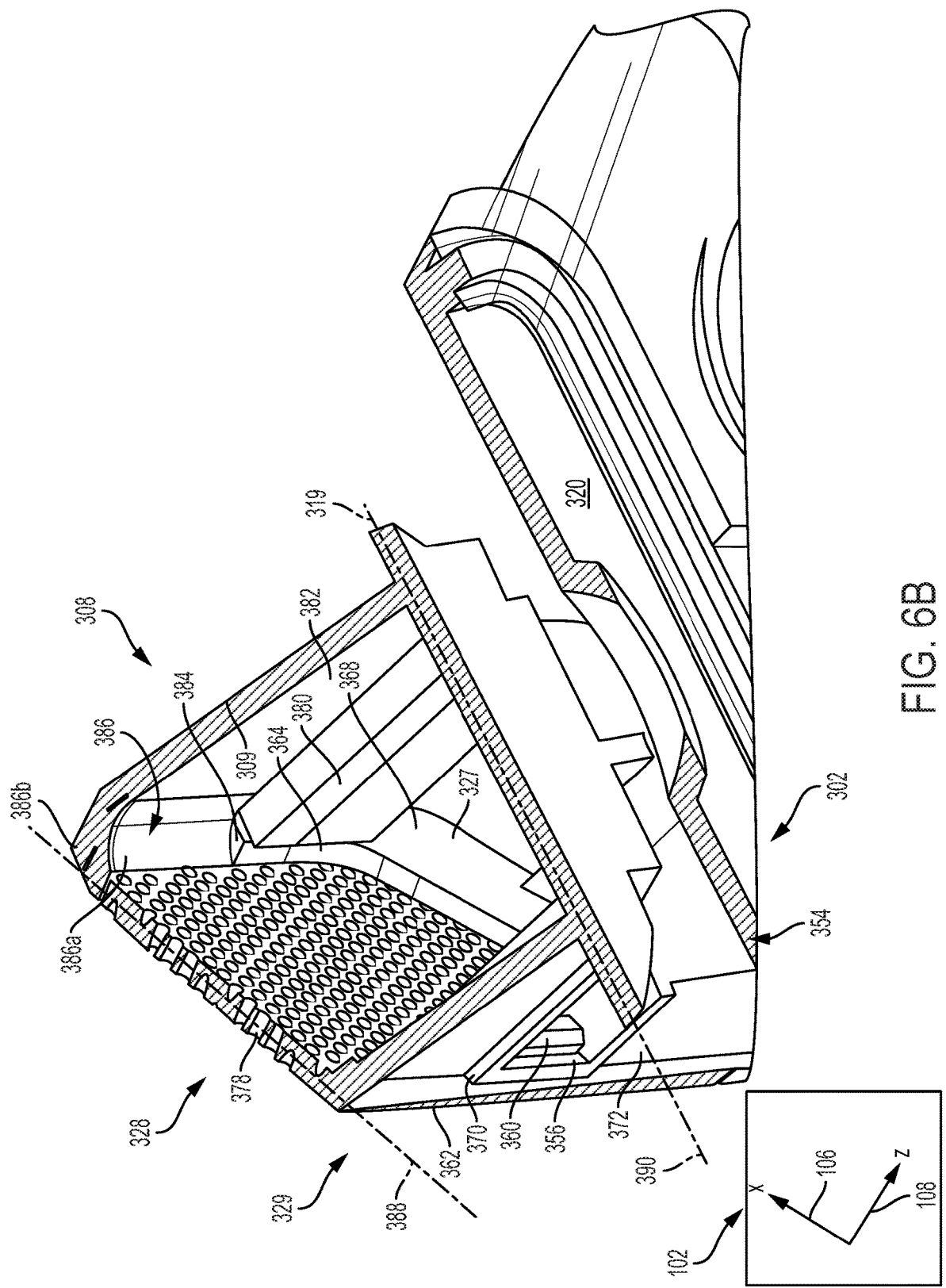
FIGS. 6B and 6C show detailed cross-sectional views of one side of the exemplary speaker system arranged in the headrest of FIG. 3 from different angles, in accordance with one or more embodiments of the present disclosure.
Figure 6C:
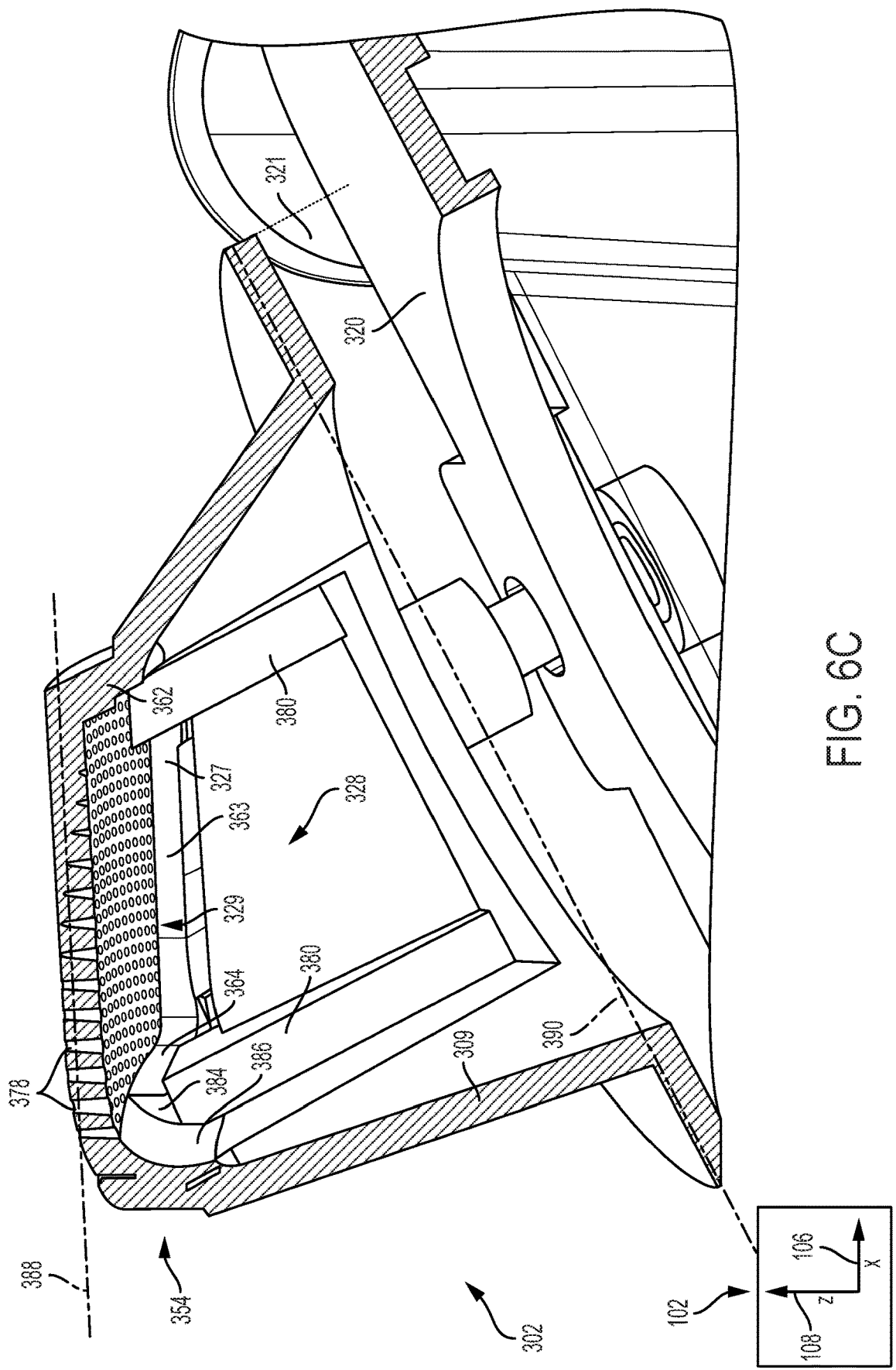

Another detailed view of one side of the speaker system 302 is shown in FIG. 5B, from the top of the speaker system 302. The horn 308 may include the bezel 319 mated to or extending from the inner end 318 of the horn 308, which may have a larger diameter than the outer end 326 of the horn 308. In other examples, the horn 308 may be coupled to the bezel 319, which may be a pad ring. The outer surface 309 of the horn between the inner end 318 and outer end 326 may be curved and a cross-section of the horn, taken in the horizontal direction 106, may be annular. The horn may be connected to the supporting plate 320 via one or more screws 322. The bezel 319 of the horn 308 may also include an opening 366 that is also an opening to the inner chamber 368 of the horn 308.

The receiving plate 354 may be attached to the outer surface 309 and the outer end 326 of the horn 308. The receiving plate 354 may be shaped to mate with the grill 328, and thus may have an outer geometry that matches (e.g., is complementary with or identical to) the outer geometry of the outer frame 327 of the grill 328. The slots 356 arranged around the circumference of the receiving plate 354 may be bordered by a plurality of slot ridges 370 that may include two portions aligned along the lateral direction 108 connected by a portion aligned along the horizontal direction 106 and the slot ridges 370 may extend outwards from a set of outer walls 372 of the receiving plate 354. The tabs 358 extending outwards from the outer frame 327 of the grill 328 may be adapted to slide into the slots 356 and secure the grill 328 to the receiving plate 354.

The grill 328 may have the first side 362 that is longer than the second side 364, as shown in FIG. 5A and described above, and may also include a top end 374 that may be curved at the joining of the top end 374 with the second side 364. The grill 328 may include the outer frame 327 with a border 376 that may be formed from a same or different material as the outer frame 327. The grill 328 may also include the inner hole pattern 329 which may comprise a plurality of apertures 378 that may be densely arranged within the inner hole pattern 329.

Different cross-sectional views of the inner elements of the headrest 300 are shown in FIGS. 6A-6C. The set of reference axes 102 is provided for comparison between views shown, indicating the vertical direction 104, the horizontal direction 106, and the lateral direction 108. The cross-sections of the speaker system are taken in the plane formed by the horizontal axis 106 and the lateral axis 108, approximately halfway down a length of the headrest in the vertical direction, and the illustrated views shown are perspectives from different angles. In FIG. 6A, the apertures 378 of the inner hole pattern 329 of the grill 328 are shown as through-holes extending through the thickness of the inner hole pattern 329. A recess 380 may be surrounded by the slot ridge 370 in the outer wall 372 of the receiving plate 354 that is attached to the outer surface 309 of the horn 308 and may extend along the height of the outer wall 372.

In FIG. 6B, the different view angle of the cross-section of the speaker system 302 shows the protrusion of the recess 380 into the inner chamber 368 of the horn 308. A view of the inner surfaces of the grill 328 and the inner surfaces of the regions where the outer frame 327 of the grill 328 mates with an inner wall 382 of the receiving plate is provided. The outer frame 327 of the grill 328 may include a cut-out 384 in the inside surface of the second side 364 of the outer frame 327 that may be at a same level as the top of the recess 380. Above the cut-out 384, the mating of the second side 364 with the inner wall 382 of the receiving plate 354 may form a curved joint 386 that is a smooth and continuous surface of the grill 328. The curved joint 386 may be seen from top view in FIG. 6C. An interior surface 386a of the curved joint 386 may have a different shape than an exterior surface 386b of the curved joint. For example, the interior surface 386a of the curved joint 386 may comprise a smooth semi-circle or arc extending form the inner hole pattern 329 of the grill 328 to an inner surface of the horn 308. The exterior surface 386b of the curved joint may have a larger surface area and curve at a right angle when transitioning between the grill 328 and the horn 308.

The inside surface of the second side 364 of the outer frame 327 in FIG. 6C may be straight, aligned with the lateral direction 108, along the height of the second side 364 in the vertical direction 104, beginning at the joining of the second side 364 with the bottom end 363 of the outer frame 327. Moving upwards in the vertical direction 104 along the second side 364, when the height reaches the top of the recess 380, the cut-out 384 may be disposed in the inner surface of the second side 364 of the outer frame 327 of the grill 328. The inner surface above the cut-out 384 may become the curved joint 386 which may extend up along a length of the second side 364. The curved joint 386 may aid in the direction of sound waves propagating through the speaker system 302 by deflecting waves to travel through and out of the grills 328 positioned adjacent to a pair of ears of an occupant.

In some examples, the grills 328 may provide at least some sound wave directivity based on a material of the grills. In examples where the grills 328 are composed of plastic or plastic composite materials, the grills 328 may be formed to redirect sound waves propagating through the speaker system 302 to propagate output sound waves that exit the grills 328 at a selected angle (e.g., perpendicular to a front/occupant-facing surface of the headrest). For example, a grill formed of plastic or a plastic composite may be integrated into the horn and the bezel to produce redirectivity of the audio waves. The grill and/or the integrated grill/bezel/horn may provide directivity of audio waves by injecting shapes or angles into the apertures of the grill. In such examples, the grills, the bezel, and/or the horn may redirect the sound waves as described. In examples where the grills 328 are composed of metal or metal composite materials, the grills 328 may not redirect sound waves and/or may provide less sound wave redirection than the redirection provided by plastic or plastic composite grills (e.g., the grill may provide audio passthrough without redirection). In such examples, the bezel and/or the horn may redirect the sound waves as described.

Returning to FIG. 6B, the plurality of apertures 378 are shown as through-holes extending through the thickness of the inner hole pattern 329 of the grill 328. The alignment of the apertures 378 relative to one another along the horizontal direction 106 may not be parallel to the horizontal direction 106. It is appreciated that the arrangement of the apertures 378 described herein should not limit the scope of the present disclosure. The optional arrangement and alignment of the apertures 378 may be selected based on other elements of the speaker system 302, such as the angling of the horns 308 and the grills 328, for channeling sound waves through the speaker system 302 and out through the grill 328.

The views provided in FIGS. 6B and 6C show that the plane 388 of the grill 328 may not be parallel with the plane 390 of the bezel 319 of the horn 308. The plane 388 of the grill 328 may be angled relative to the plane 390 of the bezel 319 so that the second side 364 of the outer frame 327 of the grill 328 may be spaced away from the bezel 319 by a greater distance, along the lateral direction 108, than the first side 362 of the outer frame 327 of the grill 328. The second side 364 of the outer frame 327 may be positioned further from the occupant than the first side 362 of the outer frame and thus the angled plane 388 of the grill 328 relative to the plane 390 of the bezel 319 may allow the grill 328 to tilt inwards towards the occupant's ears.

Figure 7A:
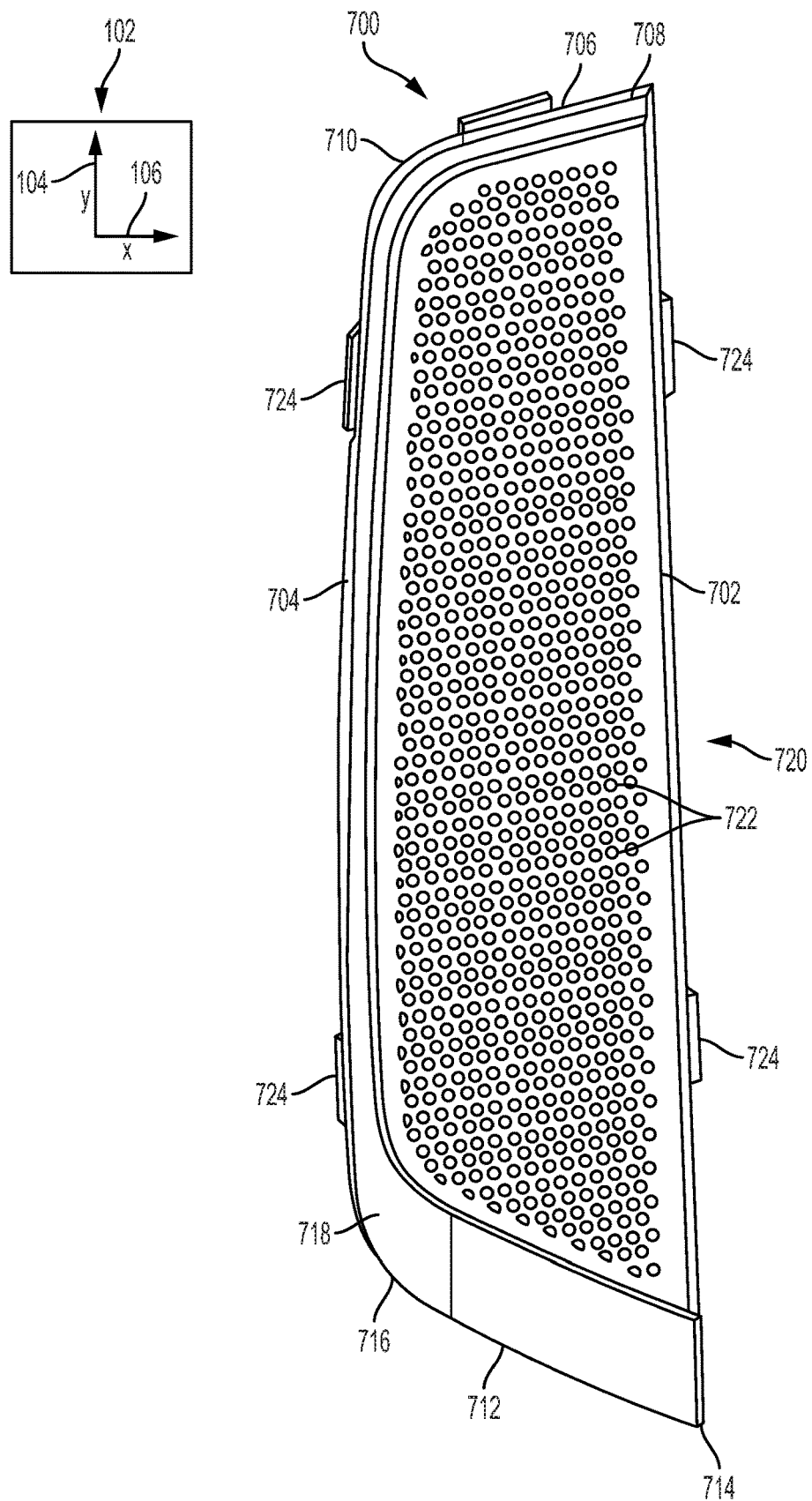
FIG. 7A shows a frontal view of an exemplary grill, in accordance with one or more embodiments of the present disclosure.
Figure 7B:
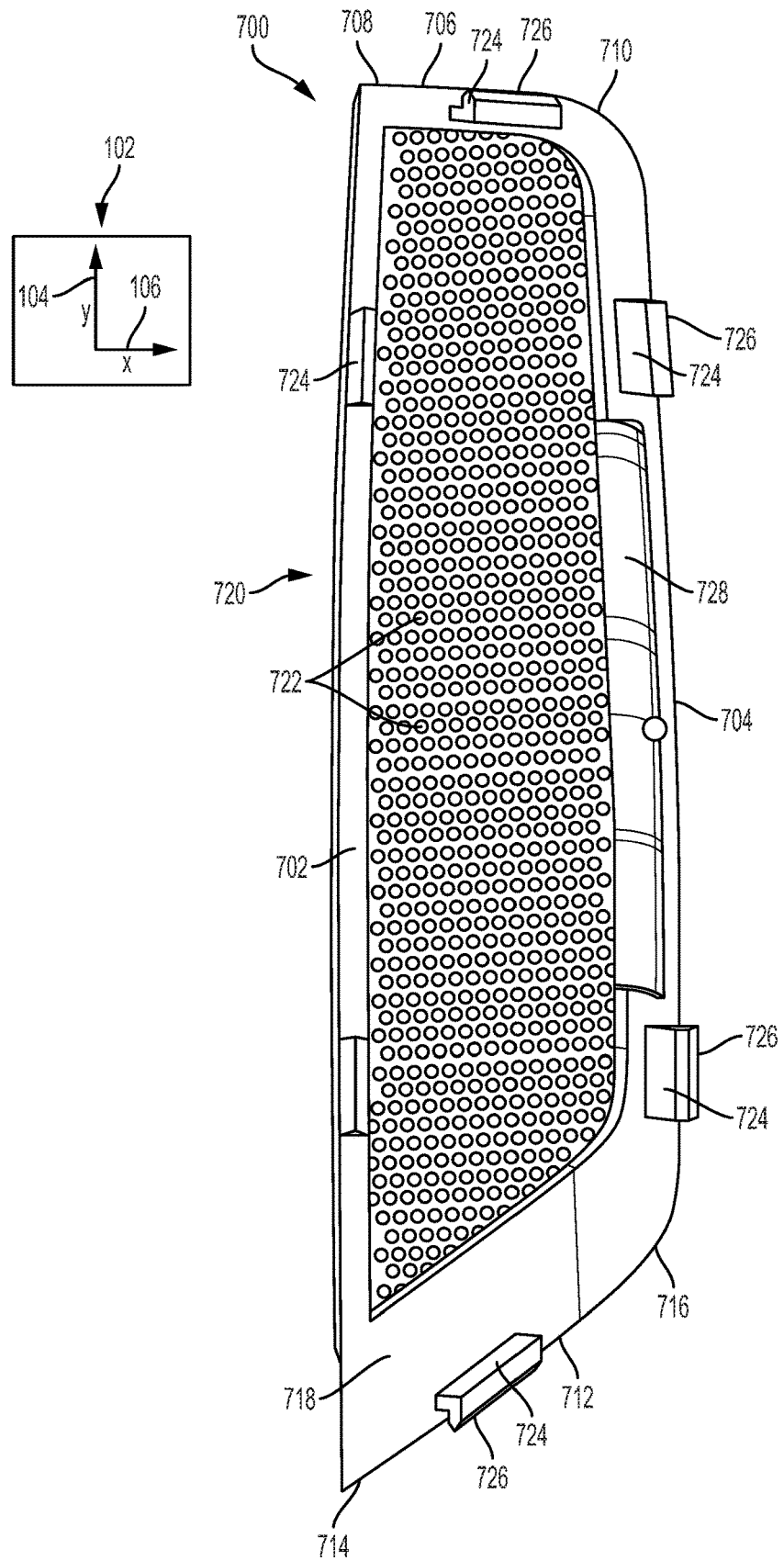
FIG. 7B shows a rear view of the exemplary grill of FIG. 7A, in accordance with one or more embodiments of the present disclosure.

Turning now to FIGS. 7A-7D, an exemplary grill 700, which may be an example of the grill 120 in FIGS. 1-2C and/or the grill 328 in FIGS. 3-6C, is shown from a frontal view, rear view, and two angles of a cross-sectional view. The set of reference axes 102 is provided for comparison between views shown, indicating the vertical direction 104, the horizontal direction 106, and the lateral direction 108. The grill 700 may have a first side 702 that is straight and may be longer than a second side 704 which may be curved. As illustrated in FIGS. 7A-7B, the grill may also include a top end 706 that is angled with respect to the horizontal direction 106 so that a first end 708 of the top end 706 that joins a top of the first side 702 may be higher, in the vertical direction 104, than a second end 710 of the top end 706 that joins a top of the second side 704. The joining of the first end 708 of the top end 706 with the top of the first side 702 may form a sharp corner while the joining of the second end 710 of the top end 706 with the top of the second side 704 may be curved.

A bottom end 712 of the grill 700 may also be angled with respect to the horizontal direction 106 so that a first end 714 of the bottom end 712 that joins with a bottom of the first side 702 may be lower, in the vertical direction 104, than a second end 716 of the bottom end 712 that joins with a bottom of the second side 704. The joining of the first end 714 of the bottom end 712 of the grill 700 with the bottom of the first end 714 may form a sharp corner. The joining of the second end 716 of the bottom end 712 of the grill 700 with the bottom of the second side 716 may be curved.

A width of the grill 700, as measured in the horizontal direction 106, may taper along the length of the grill 700 along the vertical direction 104 so that the width of the grill 700 may be narrower at the top of the grill 700 than the bottom. An outer frame 718 may circumferentially surround an inner mesh portion 720 which may include a plurality of densely spaced apertures 722. The outline formed by the outermost border of apertures 722 in the inner mesh portion 720 may be similar to the outer shape of the grill 700. The outer frame 718 may be thickest, measured along the vertical direction 104, along the bottom end 712 of the grill, of approximately equal thicknesses, measured in the horizontal 106 and vertical 104 directions respectively, along the second side 704 and top end 706, and thinnest, as measured in the horizontal direction 106, along the first side 702.

A plurality of tabs 724 may be arranged around the circumference of the outer frame 718 of the grill 700 and may have a rectangular shape, connected along a side to the outer frame 718 of the grill 700. FIG. 7B shows that the tabs 724 may extend outwards from a rear surface of the outer frame 718 and may be coupled to ledges 726 that are perpendicular to the tabs 724 and extend away from the inner mesh portion 720 of the grill 700. A closer view of the coupled tab 724 and ledge 726 may be seen in FIG. 7D. The tab 724 and ledge 726 duo may be configured to slide into matching slots in a receiving plate, such as the receiving plate 354 shown in FIGS. 5A-6C, where the ledge 726 locks the tab 724 within the slot, thereby securing the grill 700 to a speaker system, such as speaker system 302 (e.g., horn 308 of speaker system 302) shown in FIGS. 3-6C.

A curved joint 728 is shown in the rear side of grill 700 in FIG. 7B, which may be part of the curved joint 386 between the second side 364 of the grill 328 and the inner wall 382 of the receiving plate 354 that is shown in FIG. 6B. The curved joint extends along a central portion of the length, in the vertical direction 104, of the second side 704 of the grill 700. The curvature of the curved joint 728 may be adapted to match the curvature of a similarly curved joint in an inner wall of a receiving plate, as shown in FIG. 6B by the curved joint 386 between the second side 364 of the grill 328 and the inner wall 382 of the receiving plate 354, to form a smooth and continuous surface. The curvature of the curved joint 728 is also shown in the cross-sectional views provided in FIGS. 7C and 7D.

Figure 7C:
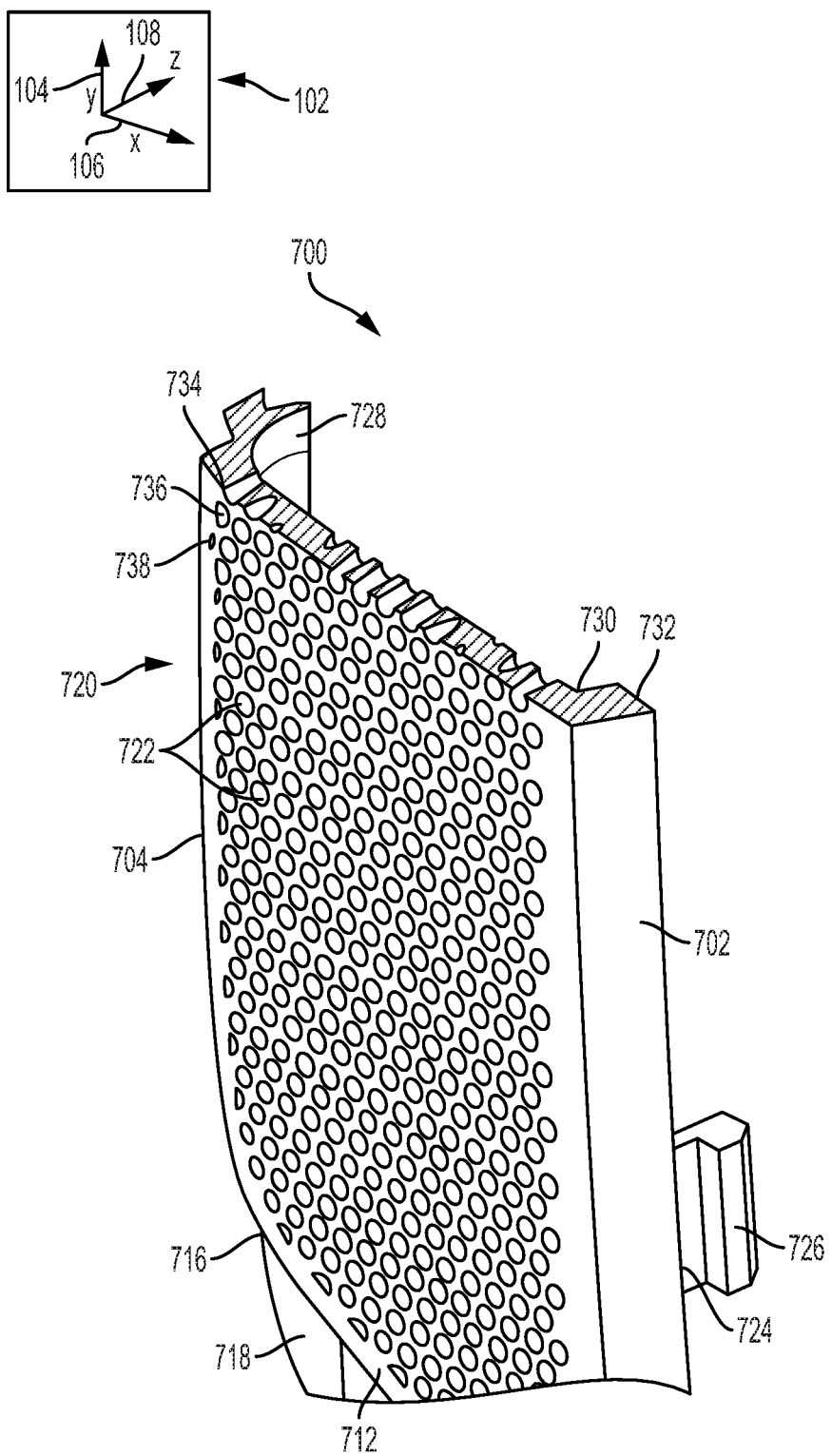
FIG. 7C shows a perspective view of a cross-section of the exemplary grill of FIG. 7A, in accordance with one or more embodiments of the present disclosure.

The curved joint 728 is positioned at an opposite end along the width, in the horizontal direction 106, of the grill 700 from the contrasting sharp angle of a perpendicular joint 730 formed between the inner mesh portion 720 and the first side 702 of the grill 700 (which may also be the first side 702 of the outer frame 718). Both the curved joint 728 and the perpendicular joint 730 may be formed from the joining of a lip 732 of the outer frame 718 of the grill 700 with the planar surface of the outer frame 718 that may extend towards the rear of the grill 700 along the lateral direction 108. FIG. 7C also shows that a front planar surface of the inner mesh portion 720 may extend outwards along the lateral direction 108 beyond a front planar surface of the outer frame 718 of the grill 700.

Figure 7D:
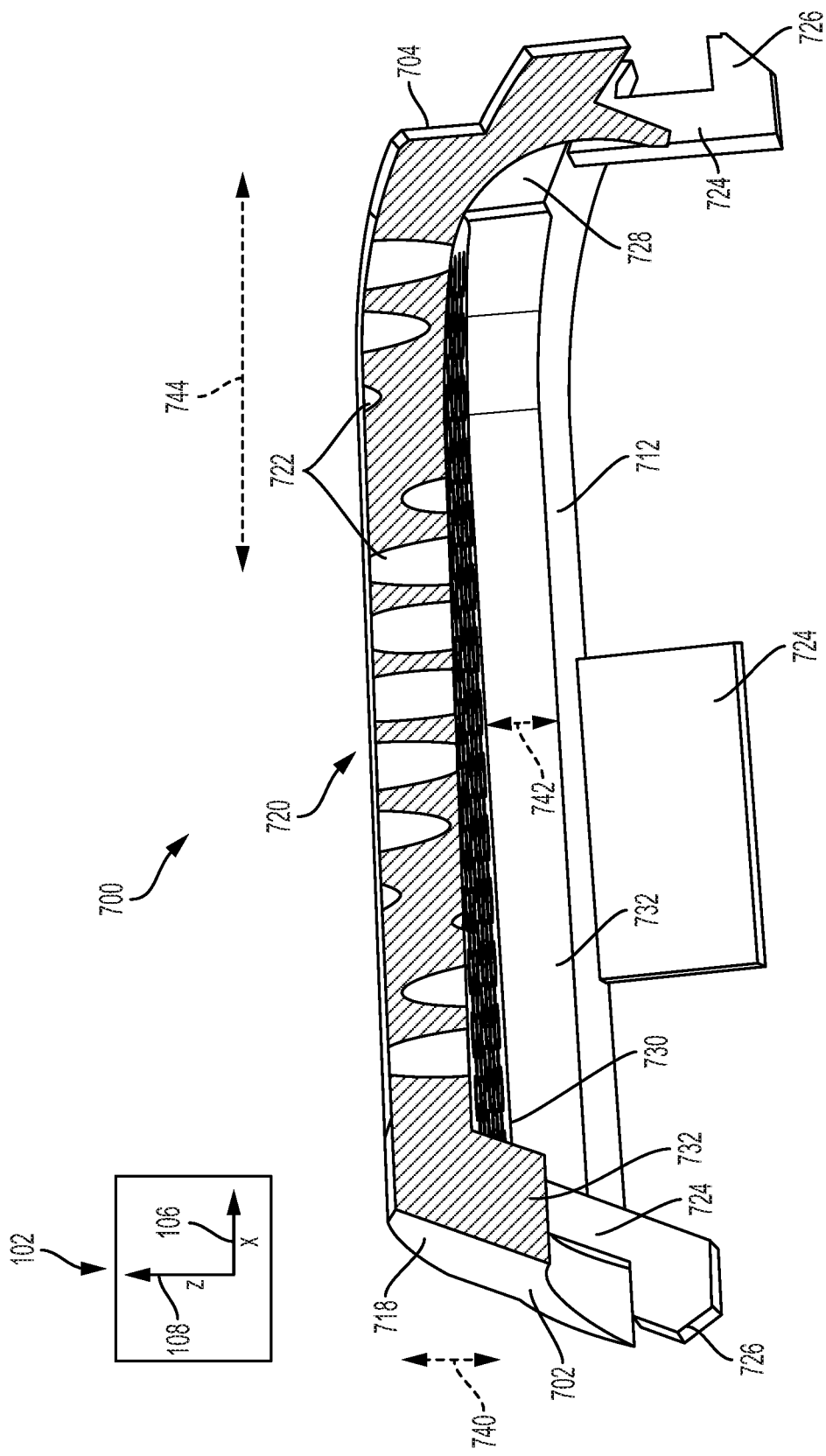
FIG. 7D shows a top perspective view of the cross-section of the exemplary grill of FIG. 7A, in accordance with one or more embodiments of the present disclosure.

The top view of the cross-section of the grill 700 illustrated in FIG. 7D shows that a thickness, as indicated by an arrow 740, of the inner mesh portion 720 of the grill 700 is relatively uniform across the width of the inner mesh portion 720. A depth, as indicated by an arrow 742 of the lip 732 of the outer frame 718 of the grill 700 is also uniform along the width of the grill 700. A portion of the width of the grill 700, indicated by an arrow 744, may be slightly curved, relative to the horizontal direction 106, so that the second side 704 of the grill 700 is lower than a central region of the grill 700.

In this way a speaker system, such as the speaker systems 200 shown in FIGS. 2A-2C and 302 shown in FIGS. 3-6C, utilizing a pair of grills, such as grills 120 of FIGS. 1-2C, grills 328 of FIGS. 3-6C, and/or grill 700 of FIGS. 7A-7D, may propagate sound straight past the ears of an occupant when adapted in a headrest, such as the headrest 100 shown in FIGS. 1-2C and/or headrest 300 in FIGS. 3-6C. In one example, the angles of the speaker system horns, such as the horns 214 shown in FIGS. 2B-2C and 308 shown in FIGS. 3-6C, coupled with transducers, such as the transducers 212 shown in FIGS. 2A-2C and 221 shown in some of the views of FIGS. 3-6C, may guide sound in a direction oriented away from the occupant's ears, thereby decreasing the occupant's listening experience. In another example, by configuring a set of grills, such as the grills 120 shown in FIGS. 1-2C, 328 shown in FIGS. 3-6C, and 700 shown in FIGS. 7A-7D, to include redirecting apertures that redirect sound from the horn to the occupant, the sounds may be deflected through the speaker system and channeled out through the grills past the occupant's ears, thereby improving sound quality for the occupant. The sound propagation through the speaker system may be assisted by a set of inner elements of the system such as a shape of an inner chamber of the horn, a curvature in the connection between the grill and a receiving plate, etc. The technical effect of the speaker system is to propagate sound, radiating by transducers, through a series of deflections provided by the elements of the speaker system, through a speaker system adapted to a headrest that directs sound waves more closely to the ears of the occupant.

FIGS. 1-7D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The description of embodiments has been presented for purposes of illustration and description. It will be appreciated that the configurations and routines disclosed herein are exemplary in nature, and ma include additional elements and/or omit elements. The specific embodiments disclosed herein are not to be considered in a limiting sense, because numerous variations are possible. For example, the above technology can be applied to speaker systems disposed in other objects or standalone speaker systems. The subject matter of the present disclosure includes all novel and non-obvious combinations and sub-combinations of the various systems and configurations, and other features, functions, and/or properties disclosed herein.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

The following claims particularly point out subject matter from the above disclosure that is regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A speaker system comprising:
    a transducer adapted to generate sound waves at a transducer output;
    a waveguide coupled to the transducer output and adapted to guide the sound waves from the transducer toward a waveguide output; and
    a grill coupled to the waveguide via a curved joint of the grill, wherein the curved joint is a continuous surface of the grill, wherein the grill comprises a plurality of apertures, and wherein the grill is adapted to redirect the sound waves from the waveguide output.

2. The speaker system of claim 1, further comprising a pad ring or bezel positioned between the transducer and the waveguide.

3. The speaker system of claim 1, wherein the transducer comprises a first transducer adapted to generate sound waves at a first transducer output, wherein the waveguide comprises a first waveguide coupled to the first transducer output and adapted to guide the sound waves from the first transducer toward a first waveguide output, and wherein the grill comprises a first grill coupled to the first waveguide via a first curved joint of the first grill and adapted to redirect the sound waves from the first waveguide output, the speaker system further comprising:
    a second transducer adapted to generate sound waves at a second transducer output;
    a second waveguide coupled to the second transducer output and adapted to guide the sound waves from the second transducer toward a second waveguide output; and
    a second grill coupled to the second waveguide via a second curved joint of the second grill and adapted to redirect the sound waves from the second waveguide output, each of the first grill and the second grill adapted to redirect the respective sound waves from the first waveguide output and the second waveguide output to a common direction.

4. The speaker system of claim 3, wherein the speaker system is arranged in a structure, the first transducer, the first waveguide, and the first grill being positioned on an opposite side of a vertical axis of the structure from the second transducer, the second waveguide, and the second grill.

5. The speaker system of claim 4, wherein each of the first transducer, the first waveguide, and the first grill, as positioned in the structure, is mirror symmetric to the second transducer, the second waveguide, and the second grill, respectively, about the vertical axis.

6. The speaker system of claim 5, wherein the common direction is perpendicular to the vertical axis.

7. The speaker system of claim 4, wherein the structure is a headrest of a vehicle, wherein a central region of the headrest is adapted to support a head of an occupant of the vehicle, and wherein the common direction extends from the first grill past an ear of the occupant when the head of the occupant is supported by the central region of the headrest.

8. The speaker system of claim 7, wherein the common direction is perpendicular to an occupant-facing front surface of the central region of the headrest.

9. The speaker system of claim 4, wherein the first grill and the second grill form a portion of a front surface of the structure, and wherein the common direction is perpendicular to the front surface of the structure.

10. The speaker system of claim 4, wherein the sound waves from the first transducer are propagated through the first waveguide in a first direction, the first direction being at angled between 25 degrees and 35 degrees relative to the common direction.

11. The speaker system of claim 3, wherein the first curved joint includes an inner surface forming an arc between the first grill and the first waveguide and an outer surface forming a right angle between the first grill and the first waveguide.

12. The speaker system of claim 3, wherein the first grill and the second grill each include a repeating, non-linear pattern of apertures.

13. The speaker system of claim 12, wherein the pattern of apertures in the first grill is based on a curvature of the first waveguide, and wherein the pattern of apertures in the second grill is based on a curvature of the second waveguide.

14. A speaker system comprising:
a first transducer and a second transducer positioned at opposing ends of a headrest;
a first waveguide and a second waveguide coupled to the first transducer and the second transducer, respectively, wherein the first waveguide and the first transducer are oriented to direct sound away from a central axis of the headrest, and
wherein the second waveguide and the second transducer are oriented to direct sound away from the central axis of the headrest; and
a first grill and a second grill coupled to the first waveguide and the second waveguide, respectively, the first grill and the second grill configured to redirect sound from the first waveguide and the second waveguide to a common direction that is parallel to the central axis of the headrest.

15. The speaker system of claim 14, wherein the first grill is coupled to the first waveguide via a first curved joint and wherein the second grill is coupled to the second waveguide via a second curved joint.

16. The speaker system of claim 14, wherein the speaker system is included in a headrest of a vehicle, wherein a central region of the headrest is adapted to support a head of an occupant of the vehicle, and wherein the common direction extends from the first grill past an ear of the occupant when the head of the occupant is supported by the central region of the headrest.

17. A headrest for a vehicle, the headrest comprising:
a first transducer and a second transducer positioned at opposing ends of the headrest;
a first waveguide and a second waveguide coupled to the first transducer and the second transducer, respectively, wherein the first waveguide and the first transducer are oriented to direct sound away from a central axis of the headrest, and
wherein the second waveguide and the second transducer are oriented to direct sound away from the central axis of the headrest; and
a first grill and a second grill coupled to the first waveguide and the second waveguide, respectively, the first grill and the second grill configured to redirect sound from being directed away from the central axis of the headrest via the first waveguide and the second waveguide to being directed towards a common direction that is parallel to the central axis of the headrest.

18. The headrest of claim 17, wherein a central region of the headrest is adapted to support a head of an occupant of the vehicle, and wherein the common direction extends from the first grill past an ear of the occupant when the head of the occupant is supported by the central region of the headrest.

19. The headrest of claim 18, wherein the common direction is perpendicular to an occupant-facing front surface of the central region of the headrest.

20. The headrest of claim 17, wherein the first grill and the second grill form a portion of a front surface of the headrest, and wherein the common direction is perpendicular to the front surface of the headrest.

* * * * *